(12) United States Patent
Parikh et al.

(10) Patent No.: US 8,282,042 B2
(45) Date of Patent: Oct. 9, 2012

(54) SKIN PANEL JOINT FOR IMPROVED AIRFLOW

(75) Inventors: Pradip Girish Parikh, Renton, WA (US); Henry John Koppelman, Seattle, WA (US); Todd Matthew Harris, Graham, WA (US); Frederick M. Swanstrom, Burien, WA (US)

(73) Assignee: The Boeing Company, Chicago, IL (US)

( * ) Notice: Subject to any disclaimer, the term of this patent is extended or adjusted under 35 U.S.C. 154(b) by 355 days.

(21) Appl. No.: 12/489,142

(22) Filed: Jun. 22, 2009

(65) Prior Publication Data

US 2010/0320325 A1 Dec. 23, 2010

(51) Int. Cl.
*B64C 1/12* (2006.01)
(52) U.S. Cl. .......................... 244/132; 244/130; 244/131
(58) Field of Classification Search .................. 244/208, 244/132, 130, 52, 131, 133, 119, 120, 123.1; 165/104.32; 204/298.09; 114/67 A; 156/243
See application file for complete search history.

(56) References Cited

U.S. PATENT DOCUMENTS

| | | | |
|---|---|---|---|
| 2,841,344 A * | 7/1958 | Stroukoff | 244/208 |
| 2,997,262 A | 8/1961 | Kirk et al. | |
| 4,316,701 A | 2/1982 | Scarpati et al. | |
| 4,575,030 A | 3/1986 | Gratzer | |
| 4,619,423 A | 10/1986 | Holmes et al. | |
| 4,727,451 A | 2/1988 | Covey | |
| 5,014,934 A | 5/1991 | McClaflin | |
| 5,065,960 A | 11/1991 | Castellucci | |
| 5,106,037 A | 4/1992 | Sherrill | |
| 5,845,872 A | 12/1998 | Pridham et al. | |
| 6,357,374 B1 * | 3/2002 | Moore et al. | 114/67 A |
| 6,736,919 B1 | 5/2004 | Roebroeks | |
| 2004/0035979 A1 | 2/2004 | McCoskey, Jr. et al. | |
| 2005/0103936 A1 | 5/2005 | Pridham et al. | |
| 2006/0163431 A1 | 7/2006 | Dittrich | |
| 2007/0181747 A1 | 8/2007 | Byrd et al. | |
| 2008/0121758 A1 * | 5/2008 | Hernandez | 244/130 |
| 2009/0020646 A1 | 1/2009 | Normand et al. | |
| 2010/0170994 A1 * | 7/2010 | Burns et al. | 244/130 |
| 2010/0308171 A1 * | 12/2010 | Kelley et al. | 244/132 |

(Continued)

FOREIGN PATENT DOCUMENTS

WO 2009017864 A2 2/2009

OTHER PUBLICATIONS

"Smoother Wing Leading-Edge Joints Would Favor Laminar Flow", Nasa Tech Briefs—ARC 14088, pp. 1-2, Jun. 1999.

(Continued)

*Primary Examiner* — Christopher P Ellis
*Assistant Examiner* — Medhat Badawi
(74) *Attorney, Agent, or Firm* — Yee & Associates, P.C.

(57) ABSTRACT

An apparatus may comprise a first skin panel having a first surface, a second skin panel having a second surface, a first flange located at an end of the first skin panel, a second flange located at an end of the second skin panel, and a strip having a third surface. The first skin panel may be located adjacent to the second skin panel such that the first flange and the second flange form a channel. The strip may be bonded in the channel. Fluid flow over the third surface of the strip, the first surface of the first skin panel, and the second surface of the second skin panel may have a desired state.

24 Claims, 21 Drawing Sheets

U.S. PATENT DOCUMENTS

2011/0168324 A1* 7/2011 Ender .......................... 156/243

OTHER PUBLICATIONS

"High Reynolds Number Hybrid Laminar Flow Control (HLFC) Flight Experiment Final Report—vol. III, Leading Edge Design, Fabrication and Installation", Boeing, Nov. 1992, pp. 62-69.

Anders et al., "F-16XL-2 Supersonic Laminar Flow Control Flight Test Experiment", NASA/TP-1999-209683, Dec. 1999, pp. 1-3.

PCT Search Report for Application No. PCT/US2010/032615 dated Jan. 6, 2011.

Drake et al., "Wing Leading Edge Joint Laminar Flow Tests", Oct. 1996, NASA Technical Memorandum 4762, pp. 1-32.

Zuniga et al., "Transonic Flight Test of a Laminar Flow Leading Edge with Surface Excrescences", AIAA-94-2142-CP, 1994, NASA Dryden Flight Research Center, pp. 267-278.

* cited by examiner

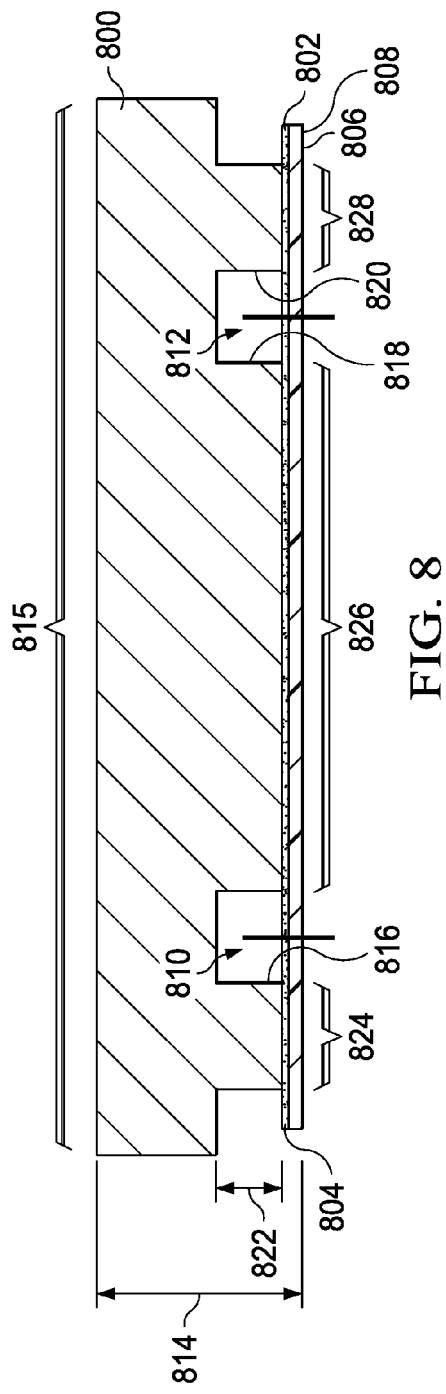
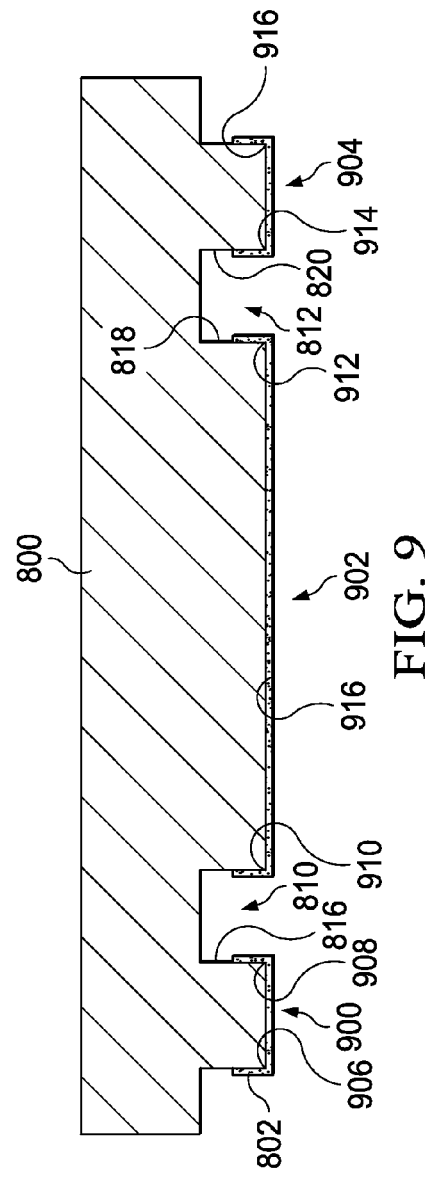
FIG. 8
FIG. 9

US 8,282,042 B2

SKIN PANEL JOINT FOR IMPROVED AIRFLOW

BACKGROUND INFORMATION

1. Field

The present disclosure relates generally to aircraft and, in particular, to a method and apparatus for an aircraft joint. Still more particularly, the present disclosure relates to a method and apparatus for an aircraft joint with improved airflow.

2. Background

A fixed-wing aircraft may be a heavier-than-air vehicle capable of flying in the air. A fixed-wing aircraft may be capable of flying due to lift, which may be generated by the wings of the aircraft. Lift may be a component of an air dynamic force acting on the aircraft. This force may be perpendicular to an oncoming flow direction. During flight, an aircraft may also experience a drag force that may be in the direction of air flow.

The performance of an aircraft may be improved through the reduction of drag that may occur when air flows over the surface of an aircraft. Laminar flow may be used to reduce drag on an aircraft. Laminar flow occurs when air flows in parallel layers without mixing between the layers of air.

With an aircraft wing, air flowing over the wing may have a boundary layer. A boundary layer may be a very thin layer of air lying over the surface of the wing and other surfaces of the aircraft. This layer of air may tend to adhere to the aircraft wing. As the aircraft wing moves forward through the air, the boundary layer at first may flow smoothly with laminar flow over the wing.

Surface discontinuities may disrupt the laminar boundary layer of air over an aircraft wing and cause it to become turbulent. A turbulent boundary layer may be characterized by increased mixing between layers of air within the boundary layer. The drag caused by a turbulent boundary layer may be as much as around 5 to 10 times larger than the drag of a laminar boundary layer. This transition from laminar flow to turbulent flow within the boundary layer may increase drag. Also, this transition may produce undesirable noise, decrease fuel efficiency, and/or other undesirable effects during flight. These discontinuities may be caused by, for example, without limitation, steps and/or gaps in joints between skin panels on an aircraft.

Maintaining a laminar boundary layer past joints between skin panels on a painted aircraft may require changes in the surface that may have tight tolerances to avoid turbulent flow. For example, these changes may include tolerances for a step in the surface, a gap, waviness, and/or other discontinuities on the surface of the aircraft. A step may be a deviation from a plane across a skin panel joint on a surface. A step also may be an abrupt deviation from a desired smoothness for the surface.

For example, a tolerance for a step may be around 0.002 inches or less to maintain a laminar boundary layer past a joint. Gaps within this tolerance may be from around 0.020 inches to around 0.050 inches. This tolerance may be difficult to achieve at joints in which skin panels meet each other with currently used manufacturing and/or installation methods for skin panels for aircraft. Further, the removal and/or reinstallation of skin panels during maintenance also may provide challenges to meeting desired tolerances for maintaining laminar flow over the surface of an aircraft.

One solution involves filling a gap between skin panels with a filler such as, for example, without limitation, a hardened epoxy filler putty. With this type of solution, fastener heads may be recessed below the surface. These fastener heads may then be covered with an epoxy filler. The epoxy filler may then be sanded to obtain the desired smoothness with respect to the surface of the skin panels. Further, mismatches at low spots at which the skin panels are attached to the support structure also may be filled with an epoxy filler and sanded down.

This type of approach, however, may be labor intensive and increase the cost of manufacturing or maintaining an aircraft. Further, the durability of these types of fillers may require reapplication of the fillers more frequently than desired. As a result, an aircraft may be out of service for maintenance more often than desired.

Therefore, it would be advantageous to have a method and apparatus that takes into account one or more of the issues discussed above, as well as possibly other issues.

SUMMARY

In one advantageous embodiment, an apparatus may comprise a first skin panel having a first surface, a second skin panel having a second surface, a first flange located at an end of the first skin panel, a second flange located at an end of the second skin panel, and a strip having a third surface. The first skin panel may be located adjacent to the second skin panel such that the first flange and the second flange form a channel. The strip may be bonded in the channel. Fluid flow over the third surface of the strip, the first surface of the first skin panel, and the second surface of the second skin panel may have a desired state.

In another advantageous embodiment, an aircraft joint may comprise a first skin panel having a first surface, a second skin panel having a second surface, a first flange located at an end of the first skin panel, a second flange located at an end of the second skin panel, a plurality of fasteners, a strip having a third surface, an adhesive, and a coating attached to at least a portion of the first surface of the first skin panel. The first skin panel and the second skin panel may be located on an aircraft and may be comprised of a material selected from one of aluminum, steel, titanium, and a composite material. The first skin panel may be located adjacent to the second skin panel such that the first flange and the second flange form a channel. The plurality of fasteners may attach the first flange and the second flange to a spar. The plurality of fasteners may have a plurality of heads having a non-stick coating, wherein the plurality of heads may be substantially coplanar to a surface of the first flange and a surface of the second flange through which the plurality of fasteners extend. The strip may be bonded in the channel. A first gap may be present between a first side of the strip and the end of the first skin panel, and a second gap may be present between a second side of the strip and the end of the second skin panel. The strip may be comprised of a material selected from one of aluminum, steel, titanium, and the composite material. The adhesive may bond the strip in the channel and may be configured to act as a sealant. The coating may extend into the channel. Airflow over the third surface of the strip, the first surface of the first skin panel, and the second surface of the second skin panel may have a substantially laminar airflow.

In yet another advantageous embodiment, a method may be present for forming a joint. A first skin panel and a second skin panel may be attached to a support structure. The first skin panel may have a first surface and a first flange located at an end of the first skin panel, and the second skin panel may have a second surface and a second flange located at an end of the second skin panel. The first flange and the second flange may be positioned to form a channel. A strip having a third surface may be bonded in the channel to form the joint, wherein a fluid flow over the first surface, the second surface, and the third surface may have a desired state.

In still yet another advantageous embodiment, a method may be present for forming a joint on an aircraft. A first skin panel and a second skin panel may be attached to a support structure. The first skin panel may have a first surface and a first flange located at an end of the first skin panel, and the second skin panel may have a second surface and a second flange located at an end of the second skin panel. The first flange and the second flange may be positioned to form a channel. The first skin panel and the second skin panel may be comprised of a material selected from one of aluminum, steel, titanium, and a composite material. A double-sided adhesive tape may be placed on a first side of a number of installation blocks. The number of installation blocks each may have a first flange, a second flange, and a third flange. A strip may be attached to the double-sided adhesive tape on the first side of the number of installation blocks. The strip may be comprised of a material selected from one of aluminum, steel, titanium, and a composite material. The strip may be attached to the double-sided adhesive tape on the first side of the number of installation blocks using an assembly crib with a plurality of guard rails and a plurality of pegs. An adhesive may be placed in the channel. The number of installation blocks may be attached to the first surface of the first skin panel and the second surface of the second skin panel over the channel to position the strip with the number of installation blocks in the channel to contact the adhesive in the channel such that a third surface of the strip may be in a desired position relative to the first surface of the first skin panel and the second surface of the second skin panel. The second flange of each installation block may attach to the strip. The first flange of each installation block may contact the first surface of the first skin panel, and the third flange of each installation block may contact the second surface of the second skin panel such that the third surface of the strip may be in the desired position. The adhesive may be cured to bond the strip in the channel to form the joint.

In a further advantageous embodiment, a method may be present for forming a joint on an aircraft. A first skin panel and a second skin panel may be attached to a spar. The first skin panel may have a first surface and a first flange located at an end of the first skin panel, the second skin panel may have a second surface and a second flange located at an end of the second skin panel, the first flange and the second flange may be positioned to form a channel, and the first skin panel and the second skin panel may be comprised of a material selected from one of aluminum, steel, titanium, and a composite material. A masking material may be placed on the first skin panel, on the second skin panel, and over a gap in the channel. An adhesive may be placed into the channel after placing the masking material on the first skin panel, on the second skin panel, and over the gap in the channel. The adhesive and the masking material over the gap may be removed in the channel prior to placing a strip on the adhesive. The strip may be placed on the adhesive on a surface of the channel. A caul plate may be placed over the strip. The caul plate placed over the strip may be covered with a vacuum bag prior to applying a vacuum. The vacuum may be applied to the caul plate. The caul plate may push the strip downward into the channel such that a fluid flow over the first surface and the second surface has a desired state.

In another advantageous embodiment, a method may be present for performing maintenance operations on a joint. A strip may be removed from the joint in a channel in which the joint comprises the strip, a first skin panel, and a second skin panel to a support structure. The first skin panel may have a first surface and a first flange located at an end of the first skin panel, the second skin panel may have a second surface and a second flange located at an end of the second skin panel, and the first flange and the second flange may be positioned to form the channel. A number of maintenance operations may be performed after removing the strip. A replacement strip having a third surface may be bonded in the channel to form the joint. A fluid flow over the first surface, the second surface, and the third surface may have a desired state.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 8 is an illustration of an installation block in accordance with an advantageous embodiment;

FIG. 9 is an illustration of double-sided tape installed on an installation block in accordance with an advantageous embodiment;

DETAILED DESCRIPTION

Figure 1:
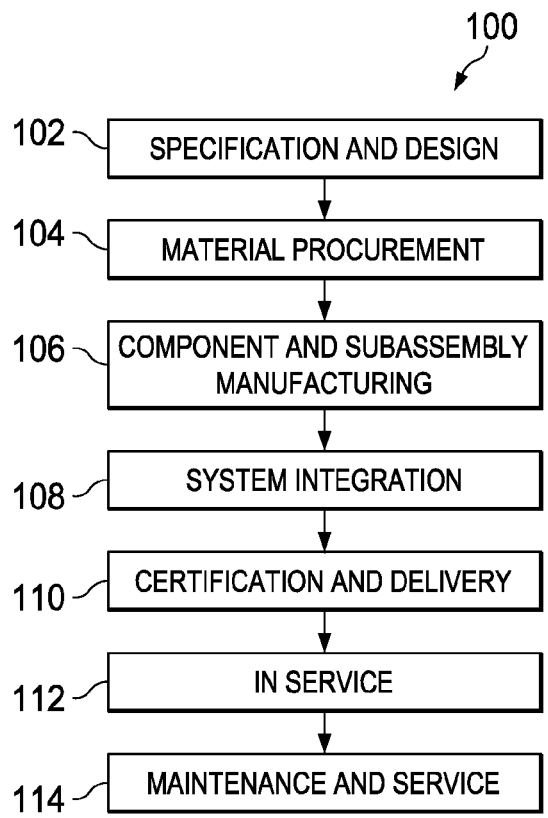
FIG. 1 is an illustration of an aircraft manufacturing and service method in accordance with an advantageous embodiment.
Figure 2:
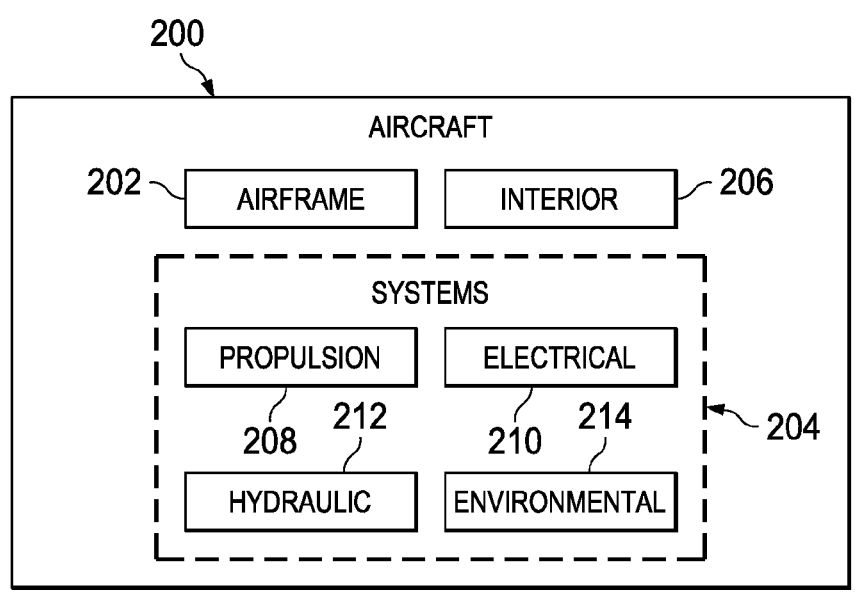
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of or reduce the cost of aircraft 200.

One or more of the advantageous embodiments may include an apparatus having a first skin panel having a first surface, a second skin panel having a second surface, a first flange located at the end of the first skin panel, a second flange located at the end of the second skin panel, and a strip having a surface. The first skin panel may be located adjacent to the second skin panel such that the first flange and the second flange form a channel. This channel may be part of a joint. The strip may be bonded in the channel. The fluid flow over the surface of the strip, the surface of the first skin panel, and the surface of the second skin panel may have a desired level. For example, the surface of the strip may be flush with the surfaces of the adjacent skin panels such that laminar flow may occur.

Figure 3:
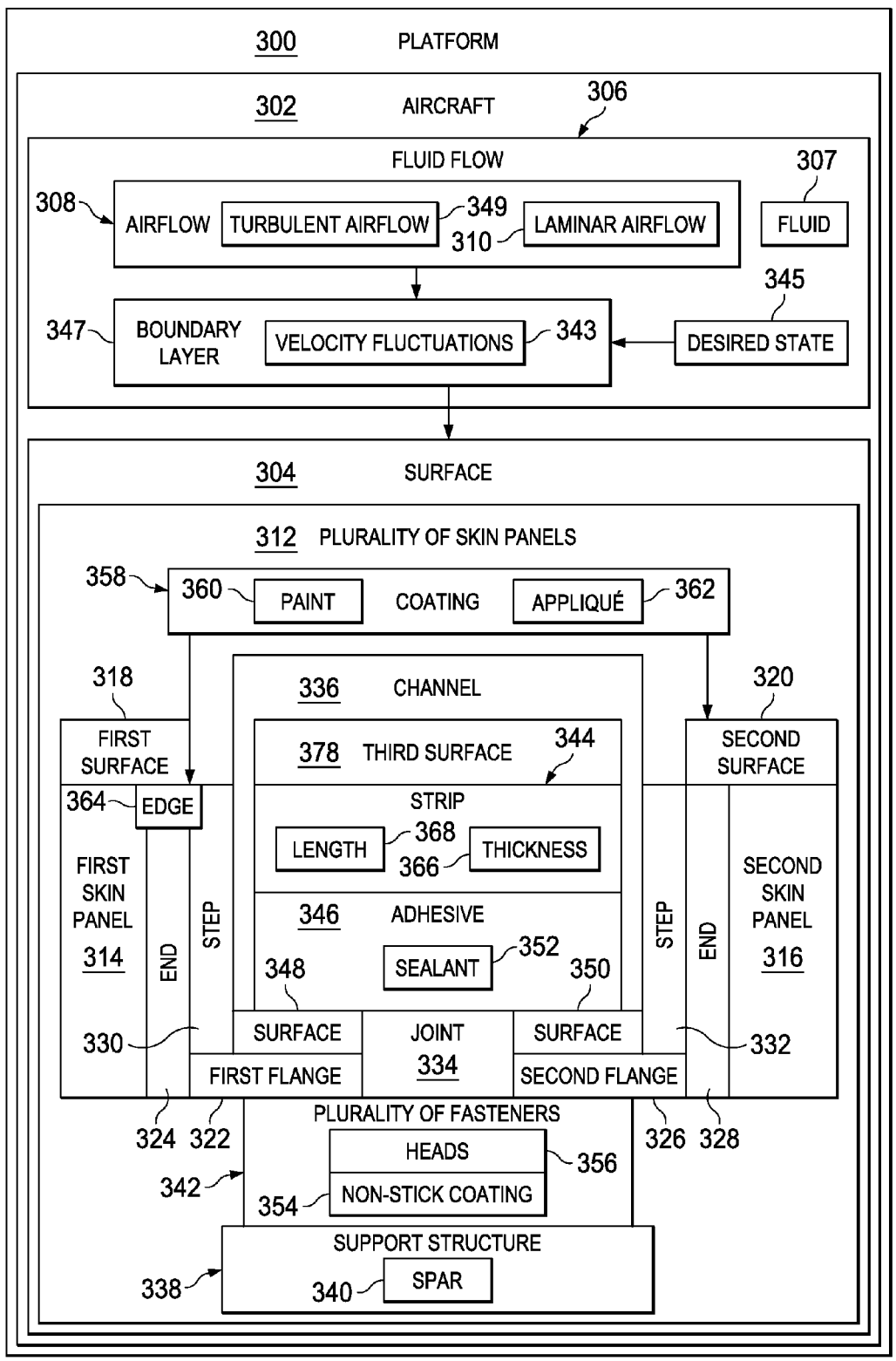
FIG. 3 is an illustration of a platform having surfaces with improved fluid flow in accordance with an advantageous embodiment.

With reference now to FIG. 3, an illustration of a platform having surfaces with improved fluid flow is depicted in accordance with an advantageous embodiment. In this advantageous embodiment, platform 300 may take the form of aircraft 302. Aircraft 302 may be, for example, without limitation, aircraft 200 in FIG. 2. In this illustrative example, aircraft 302 may have surface 304 over which fluid flow 306 may occur. Fluid flow 306 may be movement of fluid 307 over surface 304. For example, fluid flow 306 may take the form of airflow 308 in these depicted examples. Airflow 308 may take the form of laminar airflow 310.

In these depicted examples, surface 304 may comprise plurality of skin panels 312. For example, without limitation, plurality of skin panels 312 may include first skin panel 314 and second skin panel 316. First skin panel 314 may have first surface 318, and second skin panel 316 may have second surface 320. Additionally, first flange 322 may be associated with first skin panel 314 at end 324 of first skin panel 314. Second flange 326 may be associated with second skin panel 316 at end 328 of second skin panel 316.

A first component may be considered to be associated with a second component by being secured to the second component, bonded to the second component, fastened to the second component, and/or connected to the second component in some other suitable manner. The first component also may be considered to be associated with the second component by being formed as part of and/or an extension of the second component.

First flange 322 may have step 330, while second flange 326 may have step 332. In these illustrative examples, step 330 and step 332 may be below first surface 318 and second surface 320, respectively. In these illustrative examples, end 324 of first skin panel 314 may be located adjacent to end 328 of second skin panel 316 to form joint 334. End 324 and end 328 may be arranged such that first flange 322 and second flange 326 form channel 336.

Plurality of skin panels 312 may take various forms. For example, without limitation, plurality of skin panels 312 may be comprised of materials selected from at least one of aluminum, steel, titanium, a composite material, and/or any other suitable material.

In these illustrative examples, first flange 322 and second flange 326 may be made of the same material as first skin panel 314 and second skin panel 316 or from a different material, depending on the particular implementation.

In these illustrative examples, first skin panel 314 and second skin panel 316 may be attached to support structure 338. Support structure 338, in this example, may be spar 340. Of course, support structure 338 may take other forms, such as a frame, a stringer, a clip, a rib, or any other flanged structure.

In particular, first flange 322 for first skin panel 314 and second flange 326 for second skin panel 316 may be attached to support structure 338. In these illustrative examples, plurality of fasteners 342 may attach first flange 322 and second flange 326 to support structure 338 to form joint 334.

Strip 344 may be bonded in channel 336 for joint 334. In these illustrative examples, strip 344 may take various forms. For example, without limitation, strip 344 may be comprised of plastic, a composite material, titanium, aluminum, or some other suitable material. Strip 344 may be bonded in channel 336 using adhesive 346. Adhesive 346 may be any compound in a liquid and/or semi-liquid state that may be used to bond strip 344 in channel 336.

In particular, adhesive 346 may be placed onto surface 348 of first flange 322 and surface 350 of second flange 326 in channel 336. Then strip 344 may be placed into channel 336. In other advantageous embodiments, adhesive 346 may be applied to strip 344 and/or surface 348 of first flange 322 and surface 350 of second flange 326 prior to the joining of first flange 322 and second flange 326 to form channel 336. Strip 344 with adhesive 346 may then be placed onto surface 348 and surface 350.

In these illustrative examples, adhesive 346 also may act as sealant 352. In other words, adhesive 346 may be selected as a material that may prevent and/or reduce the penetration of undesirable components such as, for example, without limitation, air, gas, water, dust, and/or other undesirable components. Further, adhesive 346 may be selected as a material that may elongate and/or remain flexible during use. The selection of adhesive 346 may be such that cracking may be reduced and/or avoided during use.

In these depicted examples, plurality of fasteners 342 may have non-stick coating 354 on heads 356 of plurality of fasteners 342. Non-stick coating 354 may allow for easier removal of plurality of fasteners 342 during maintenance operations. For example, without limitation, non-stick coating 354 may prevent and/or reduce sticking of adhesive 346 to heads 356 of plurality of fasteners 342. Further, plurality of fasteners 342 may be countersunk into surface 348 of first flange 322 and surface 350 of second flange 326.

Strip 344 may be selected using a material having a similar thermal coefficient of expansion as first skin panel 314 and second skin panel 316. Also, strip 344 may be selected using a material that provides flexibility or flexing of strip 344 during use.

At least one of first skin panel 314 and second skin panel 316 may have coating 358. Coating 358 may be, for example, without limitation, paint 360, appliqué 362, and/or some other suitable type of coating. When coating 358 is applied to first surface 318 of first skin panel 314, coating 358 may extend over edge 364 of first skin panel 314 at end 324 into channel 336. Coating 358 may extend only into a portion of channel 336 rather than all of channel 336.

Strip 344 may be selected to have thickness 366 and length 368. These parameters and/or other parameters of strip 344 may be selected to provide a desired level of fluid flow 306 over first skin panel 314 and second skin panel 316. In these examples, these parameters may be selected such that first surface 318 of first skin panel 314, second surface 320 of second skin panel 316, and third surface 378 of strip 344 have desired state 345 of fluid flow 306. More specifically, these parameters may be selected such that boundary layer 347 of fluid flow 306 may have desired state 345.

Desired state 345 of fluid flow 306 may be at least one of fluid flow 306 over joint 334, over all of first surface 318 of first skin panel 314, second surface 320 of second skin panel 316, and third surface 378 of strip 344 on joint 334, a portion of either or both first surface 318 of first skin panel 314, second surface 320 of second skin panel 316, and third surface 378 of strip 344 over joint 334, or some other combination of components including joint 334.

In these illustrative examples, desired state 345 for boundary layer 347 may be substantially laminar airflow 310. Laminar airflow 310 may be distinguished from turbulent airflow 349 for boundary layer 347 by detecting velocity fluctuations 343 within boundary layer 347, in these examples. For example, without limitation, velocity fluctuations 343 may be detected through the use of a laser anemometer.

The illustration of platform 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, platform 300 may take other forms. For example, platform 300 may be a submarine, and fluid flow 306 may be the flow of water. In yet other advantageous embodiments, only some of plurality of skin panels 312 may include a joint with a configuration such as joint 334 as described above.

Figure 4:
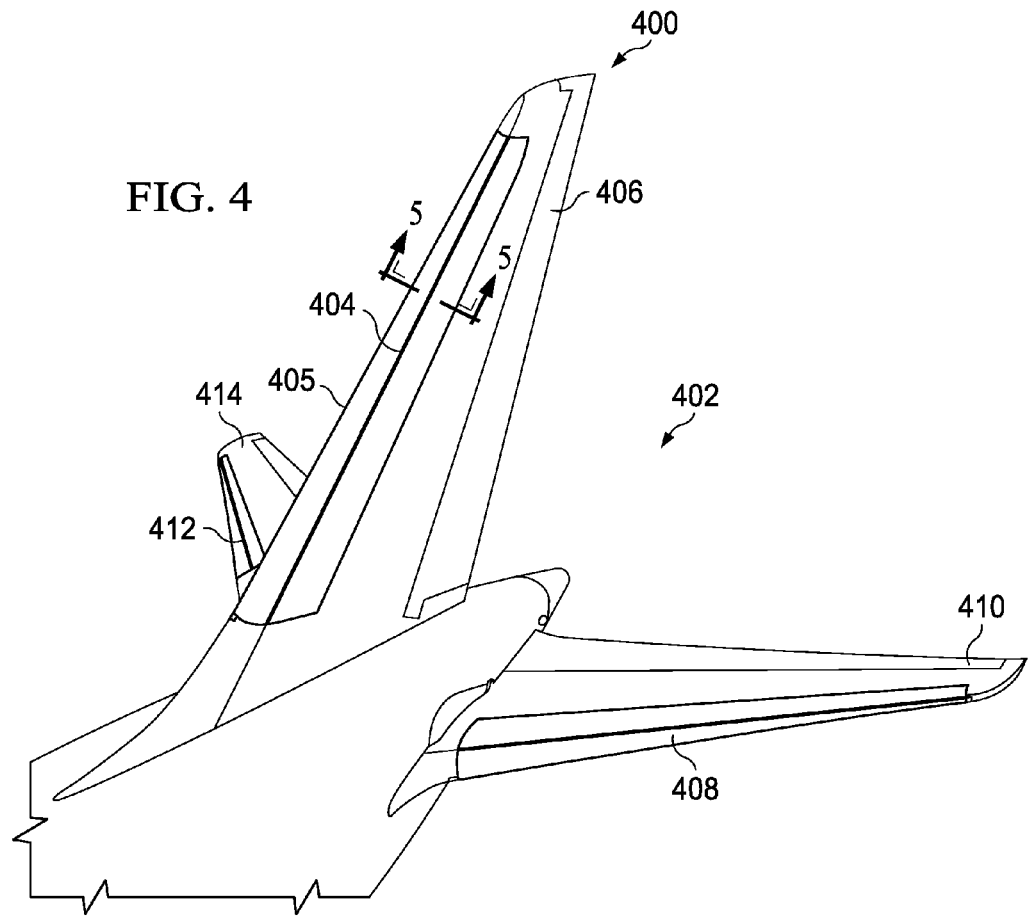
FIG. 4 is an illustration of a portion of an aircraft in accordance with an advantageous embodiment.

With reference now to FIG. 4, an illustration of a portion of an aircraft is depicted in accordance with an advantageous embodiment. In this illustrative example, tail 400 of aircraft 402 is depicted. Aircraft 402 may be an example of one implementation of aircraft 302 in FIG. 3. In this example, the different advantageous embodiments may be applied to joint 404 near leading edge 405 of vertical stabilizer 406. The different advantageous embodiments also may be applied to other joints such as, for example, without limitation, joints 408 and 412 on horizontal stabilizers 410 and 414, respectively. These joints may be implemented using joint 334 in FIG. 3.

Figure 5:
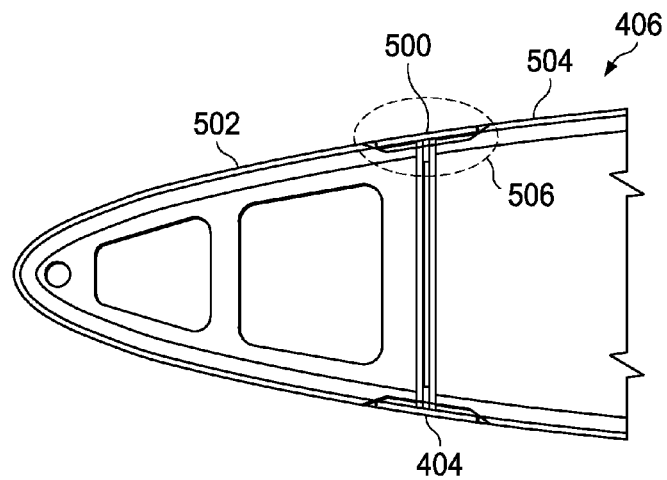
FIG. 5 is an illustration of a cross-sectional view of a portion of a vertical stabilizer in accordance with an advantageous embodiment.

With reference next to FIG. 5, an illustration of a cross-sectional view of a portion of a vertical stabilizer is depicted in accordance with an advantageous embodiment. Joint 500 may be an example of one physical implementation for joint 334 in FIG. 3.

In this depicted example, vertical stabilizer 406 may be illustrated in a cross section taken along lines 5-5 in FIG. 4. In this example, joints 404 and 500 may be seen for vertical stabilizer 406. As can be seen in this example, joint 500 may be formed where skin panel 502 and skin panel 504 meet. Section 506 is shown in more detail below in FIG. 6.

Figure 6:
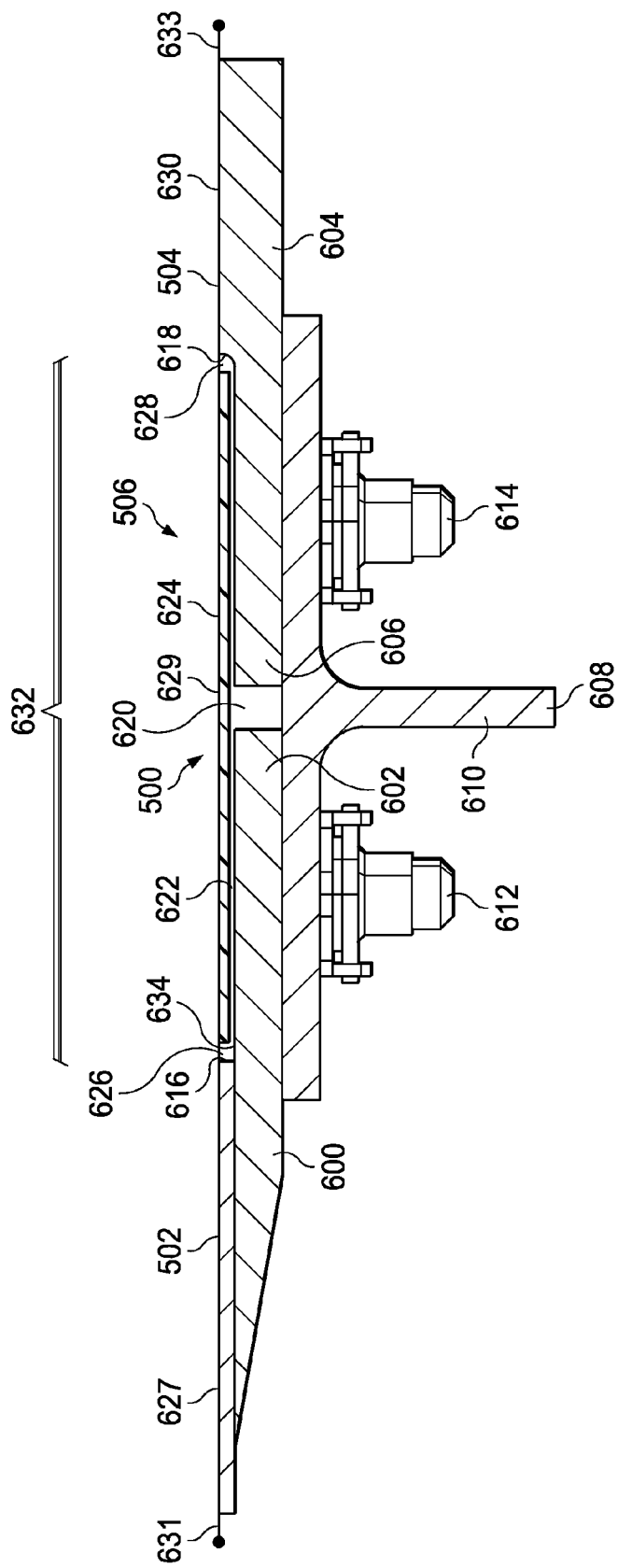
FIG. 6 is an illustration of a more-detailed view of a joint in a vertical stabilizer in accordance with an advantageous embodiment.

With reference now to FIG. 6, an illustration of a more-detailed view of a joint in a vertical stabilizer is depicted in accordance with an advantageous embodiment. In this depicted example, flange 600 may be located at end 602 of skin panel 502. Flange 604 may be located at end 606 of skin panel 504.

In this illustrative example, flange 600 and flange 604 may be attached to support structure 608. In this illustrative example, support structure 608 may take the form of spar 610. Flange 600 may be attached to support structure 608 by fastener 612, and flange 604 may be secured to support structure 608 by fastener 614. As can be seen, step 616 may be present in flange 600, and step 618 may be present in flange 604. Additionally, gap 620 may be present between flange 600 and flange 604. In these illustrative examples, flanges 600 and 604 may be bonded to skin panels 502 and 504, respectively.

As can be seen in FIG. 6, flange 600 and flange 604 may form channel 622. Strip 624 may be bonded in channel 622. Gap 626 and gap 628 may still be present. Each of these gaps may have a width of around 0.020 inches to around 0.050 inches in these particular examples. Of course, other tolerances may be used, depending on the particular implementation. For example, the size of these gaps may be selected as being small enough to avoid undesirable airflow over surface 627 of skin panel 502, surface 629 of strip 624, and surface 630 of skin panel 504.

In these depicted examples, surface 627 of skin panel 502, surface 629 of strip 624, and surface 630 of skin panel 504 may lie substantially along plane 631 as indicated by line 633. In other words, strip 624 may be positioned relative to skin panel 502 and skin panel 504 such that these surfaces may provide airflow having a desired state. The desired state, in these examples, may be laminar airflow.

In this illustrative example, channel 622 may have length 632 and depth 634. Length 632 may be, for example, without limitation, around 1.80 inches. Depth 634 may be, for example, without limitation, around 0.04 inches. As can be seen, strip 624 may cover fasteners 612 and 614. Further, the dimensions of strip 624 may be selected to accommodate variations in skin panel 502 and/or skin panel 504. Additionally, strip 624 also may be selected to accommodate thicknesses for coatings that may be placed onto surface 627 and surface 630 of skin panel 502 and skin panel 504.

Figure 7:
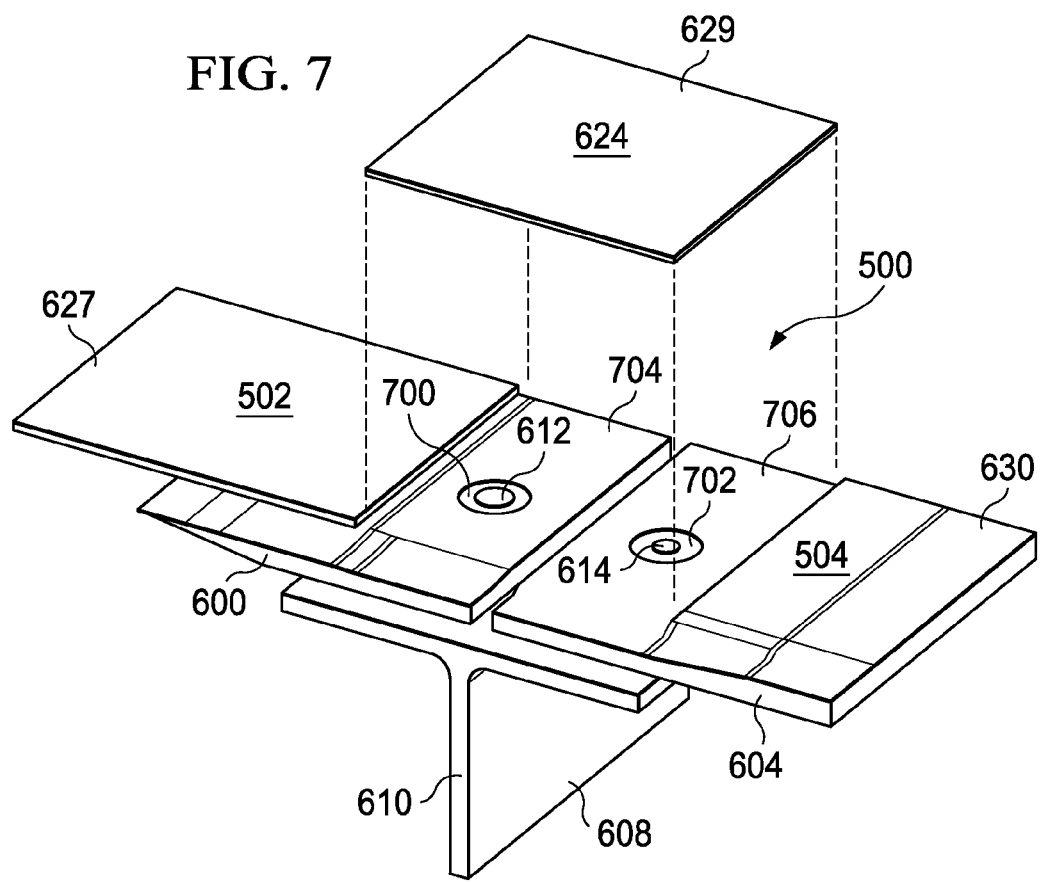
FIG. 7 is an illustration of an exploded perspective view of a joint in accordance with an advantageous embodiment.

Turning now to FIG. 7, an illustration of an exploded perspective view of a joint is depicted in accordance with an advantageous embodiment. As can be seen in this illustrative example, head 700 for fastener 612 and head 702 for fastener 614 may be seen. Head 700 and head 702 may be countersunk into surface 704 of flange 600 and surface 706 of flange 604. In this illustrative example, head 700 and head 702 may be at a level substantially flush with surface 704. In other examples, head 700 and head 702 may be at a level below surface 704.

Additionally, head 700 and head 702 may have a non-stick coating, which may allow for easier maintenance if strip 624 is removed from joint 500.

Turning now to FIGS. 8-13, illustrations of installation of a strip into a channel in a joint are depicted in accordance with an advantageous embodiment. These different figures may illustrate an illustrative example of one manner in which a strip, such as strip 344, may be installed to complete a joint, such as joint 334 in FIG. 3. This installation may occur during, for example, without limitation, at least one of manufacturing of joint 334 and maintenance of joint 334.

With reference to FIG. 8, an illustration of an installation block is depicted in accordance with an advantageous embodiment. In this illustrative example, installation block 800 may have double-sided tape 802 applied to side 804 of installation block 800. Double-sided tape 802 may have protective cover 806 on side 808. Slits 810 and 812 may be cut into double-sided tape 802 in these examples.

As depicted, installation block 800 may have height 814 and length 815. Height 814 may be around 1 inch, and length 815 may be around 4 inches in these illustrative examples. Additionally, installation block 800 also may have flange 816, flange 818, and flange 820. Each of these flanges may have height 822. Height 822 may be around 0.5 inches in these examples. Flange 816 may have length 824, flange 818 may have length 826, and flange 820 may have length 828. Lengths 824 and 828 may be around 0.5 inches, and length 826 may be around 1.7 inches. In these examples, installation block 800 may be comprised of a material such as, for example, without limitation, aluminum and/or some other suitable material.

With reference now to FIG. 9, an illustration of double-sided tape installed on an installation block is depicted in accordance with an advantageous embodiment. In this illustrative example, after slits 810 and 812 have been formed as depicted in FIG. 8, sections 900, 902, and 904 may be present for double-sided tape 802. Section 900 may be wrapped around corners 906 and 908 for flange 816. Section 902 may be wrapped around corners 910 and 912 of flange 818. Section 904 may be wrapped around corners 914 and 916 for flange 820.

Figure 10:
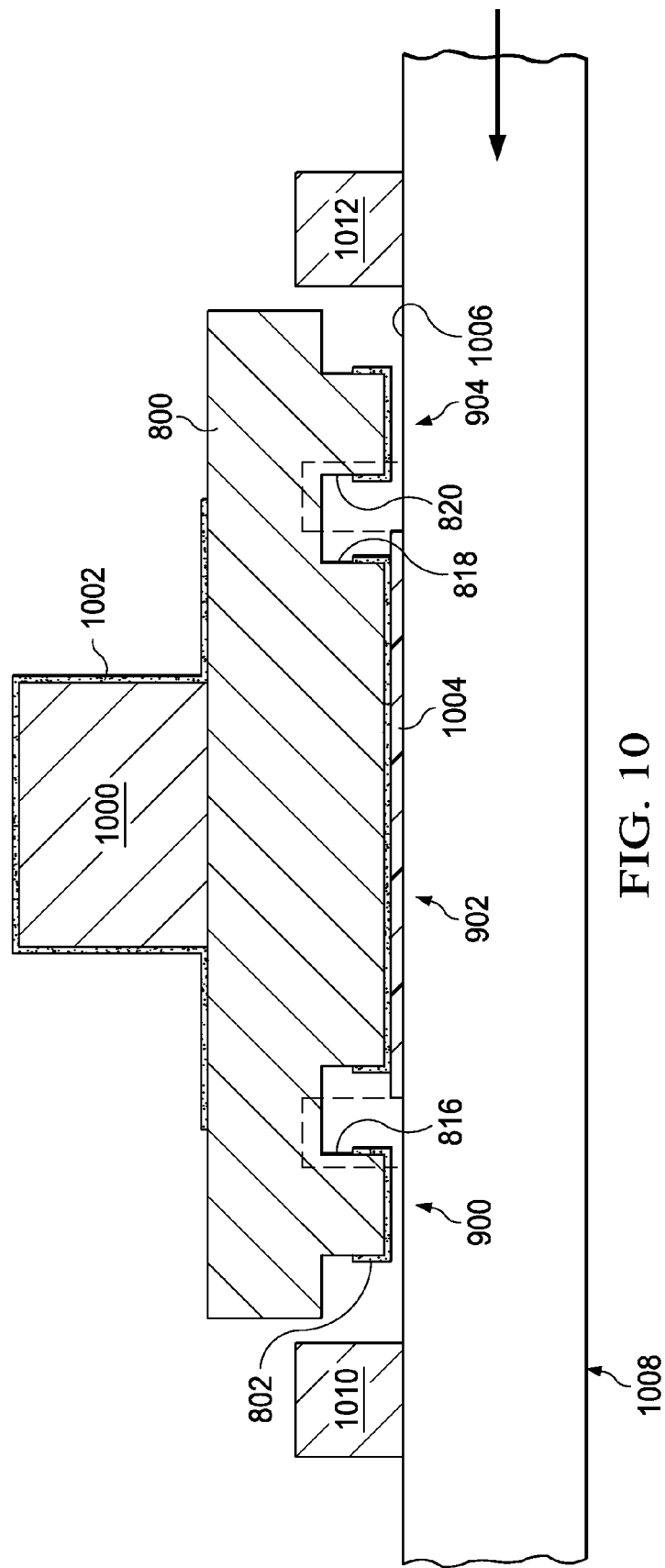
FIG. 10 is an illustration of an installation block attached to a strip in accordance with an advantageous embodiment.

With reference next to FIG. 10, an illustration of an installation block attached to a strip in an assembly crib is depicted in accordance with an advantageous embodiment. In this illustrative example, a side view of installation block 800 is shown. In this example, installation bar 1000 may be associated with installation block 800. In this illustrative example, installation bar 1000 may be associated with installation block 800 by attaching installation bar 1000 to installation block 800 with tape 1002. Of course, installation bar 1000 may be associated with installation block 800 in other ways. For example, without limitation, installation bar 1000 may be attached to installation block 800 by temporary fasteners. In these illustrative examples, installation bar 1000 may be comprised of a material such as, for example, without limitation, aluminum.

In this depicted example, installation block 800 may be positioned over strip 1004. In this example, strip 1004 may be located on surface 1006 of assembly crib 1008. Installation block 800 may be positioned to be attached to strip 1004 using guard rail 1010 and guard rail 1012 on assembly crib 1008. As can be seen in this illustrative example, section 902 on flange 818 may contact and/or become attached to strip 1004. Section 900 on flange 816 and section 904 on flange 820 may not contact strip 1004.

Figure 11:
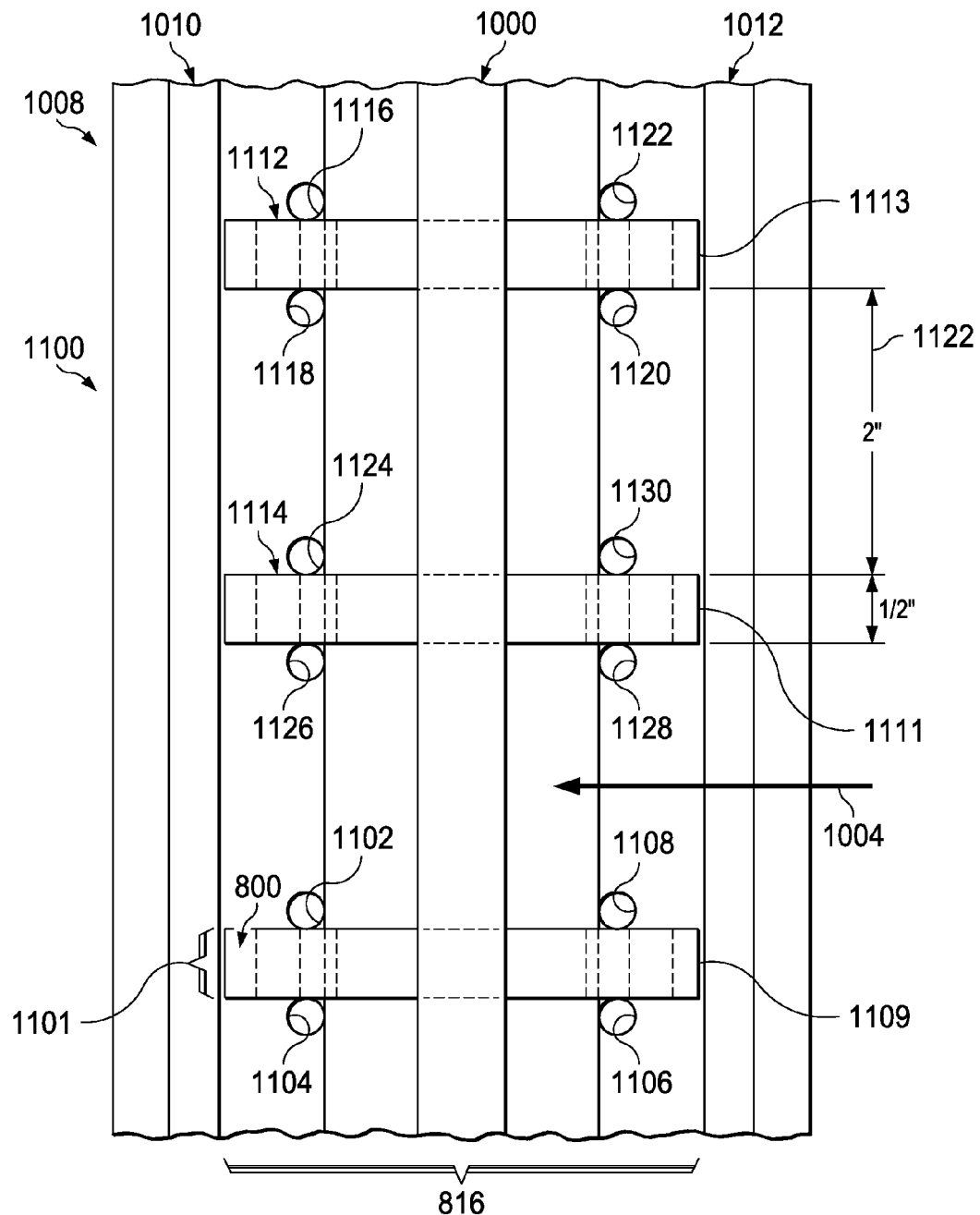
FIG. 11 is an illustration of a top view of an assembly crib in accordance with an advantageous embodiment.

Turning now to FIG. 11, an illustration of a top view of an assembly crib is depicted in accordance with an advantageous embodiment. In this illustrative example, installation block 800 may be seen positioned over strip 1004. Installation block 800 may have width 1101. Width 1101 may be, for example, without limitation, from around 0.500 to around 0.750 inches.

Additional alignment of installation block 800 may be provided through number of pegs 1100. In this example, number of pegs 1100 may include peg 1102, peg 1104, peg 1106, and peg 1108.

In this top view, installation blocks 1112 and 1114 also may be seen. These installation blocks may be positioned using guard rails 1010 and 1012. In these examples, installation blocks 800, 1112, and 1114 may be positioned with a distance of around 2 inches in between each other. In other examples, the installation blocks may be positioned with a different spacing. Additionally, installation block 1112 also may be positioned using installation pegs 1116, 1118, 1120, and 1122. Installation block 1114 may be positioned using installation pegs 1124, 1126, 1128, and 1130, and/or other installation pegs.

Once installation blocks, such as installation blocks 800, 1112, and 1114, have been attached to strip 1004, installation bar 1000 may be attached on top of installation blocks 800, 1112, and 1114. Strip 1004 may then be moved and positioned into the channel using installation blocks 800, 1112, and 1114 with installation bar 1000. In these illustrative examples, additional installation blocks (not shown) may be positioned over strip 1004. An installation bar, such as installation bar 1000, also may be attached to these additional installation blocks.

Figure 12:
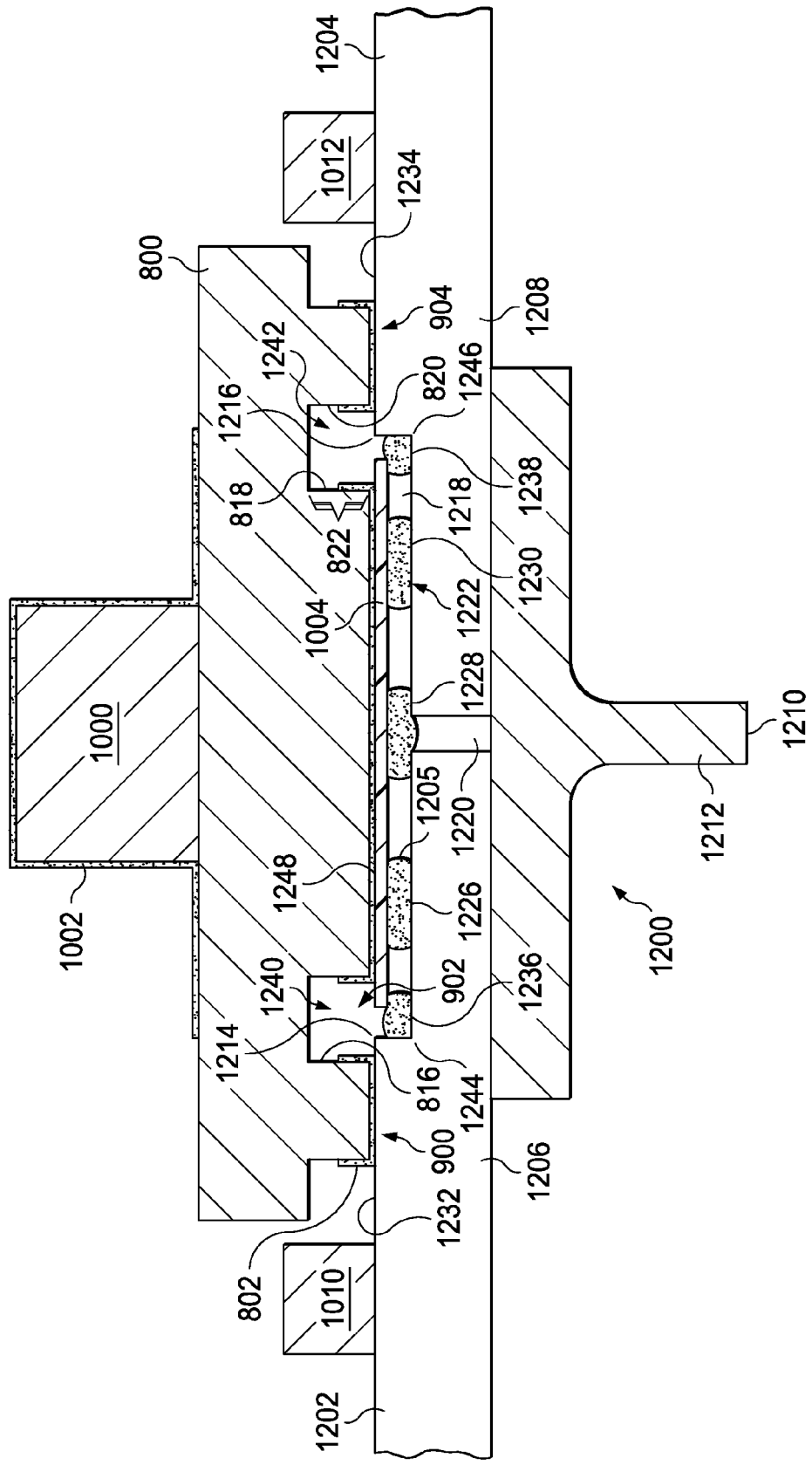
FIG. 12 is an illustration of a strip installed into a channel using an installation block in accordance with an advantageous embodiment.

With reference now to FIG. 12, an illustration of a strip installed into a channel using an installation block is depicted in accordance with an advantageous embodiment. In this illustrative example, installation block 800 may be seen in a side view over joint 1200.

Joint 1200 may include first skin panel 1202 and second skin panel 1204. First skin panel 1202 may have first flange 1206, while second skin panel 1204 may have second flange 1208. First flange 1206 and second flange 1208 may be attached to support structure 1210, which may be spar 1212 in these examples. As can be seen, first flange 1206 and second flange 1208 may have step 1214 and step 1216, which form channel 1218 in this configuration. As can be seen, gap 1220 may be present between first flange 1206 and second flange 1208 within channel 1218.

Prior to strip 1004 being positioned in channel 1218, adhesive 1222 may be placed in channel 1218 in lines 1226, 1228, and 1230. As can be seen, line 1228 of adhesive 1222 may cover gap 1220. In some examples, adhesive 1222 may be placed into gap 1220 to fill gap 1220.

Additionally, installation block 800 may position strip 1004 such that surface 1248 of strip 1004 may be substantially planar to surface 1232 of first skin panel 1202 and surface 1234 of second skin panel 1204 at position 1205. Installation block 800 may hold strip 1004 in this position until adhesive 1222 cures. This placement of strip 1004 at position 1205 may be performed through the selection of height 822 for flanges 816, 818, and 820. Section 900 and section 904 of double-sided tape 802 may attach installation block 800 to surface 1232 of first skin panel 1202 and surface 1234 of second skin panel 1204. This may maintain installation block 800 in desired position 1205 while adhesive 1222 cures. Additionally, adhesive 1222 also may be placed in lines 1236 and 1238 and may be applied through gaps 1240 and 1242 in corners 1244 and 1246.

In this illustrative example, guard rail 1010 and guard rail 1012 may be used to aid in the positioning of strip 1004. In particular, guard rail 1010 and guard rail 1012 may be used to place installation block 800 in a desired location over channel 1218.

Figure 13:
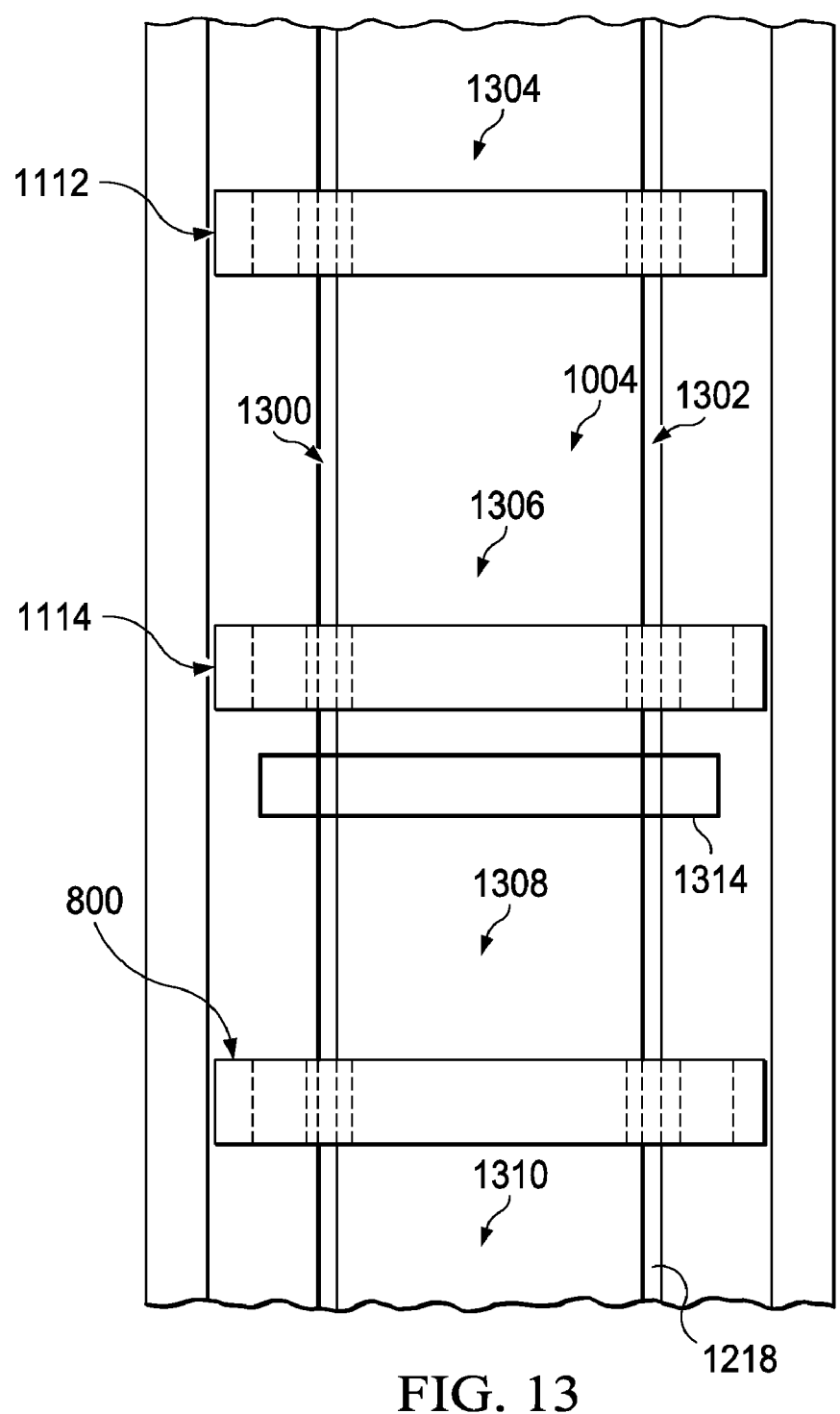
FIG. 13 is an illustration of a top view of a strip installed in a joint in accordance with an advantageous embodiment.

Turning now to FIG. 13, an illustration of a top view of a strip installed in a joint is depicted in accordance with an advantageous embodiment. Installation bar 1000 may be removed after flanges 816 and 820 of installation blocks 800, 1112 and 1114 are attached to the outer surfaces of skin panels 1202 and 1204. As can be seen in this top view, strip 1004 may be located in channel 1218 and held in place while adhesive 1222 (not shown) cures.

As can be seen in this example, gap 1300 and gap 1302 may be present. Gap 1300 and gap 1302 may have a width from around 0.030 inches to around 0.060 inches in this particular example. Of course, the gaps may vary, depending on the particular implementation. Gaps may be present to take into account thermal expansion of different components. Adhesive 1222 may be placed into gaps 1300 and 1302 during curing of adhesive 1222 in channel 1218. Adhesive 1222 may be placed into gaps 1300 and 1302 using, for example, without limitation, a syringe and/or some other suitable device.

In these illustrative examples, sections 1304, 1306, 1308, and 1310 may be unsupported by installation blocks 800, 1112, and 1114. Roller 1314 may be moved over one or more of these sections to squeeze down adhesive 1222. In these examples, additional adhesive 1222 may be added into gaps 1300 and 1302 in channel 1218 to prevent undesirable materials from gathering beneath strip 1004. In other words, adhesive 1222 may be used to fill and/or seal gaps 1300 and 1302.

Installation blocks 800, 1112, and 1114 may be left in place as illustrated in FIG. 13 until adhesive 1222 sets-up and/or cures to a desired level. Thereafter, installation blocks 800, 1112, and 1114 may be removed.

With reference now to FIGS. 14-22, illustrations of a process for installing a strip are depicted in accordance with an advantageous embodiment. These different figures may illustrate one manner in which a strip, such as strip 344, may be installed to complete a joint, such as joint 334 in FIG. 3. This installation may occur, for example, without limitation, during at least one of manufacturing joint 334 and maintenance of joint 334.

Figure 14:
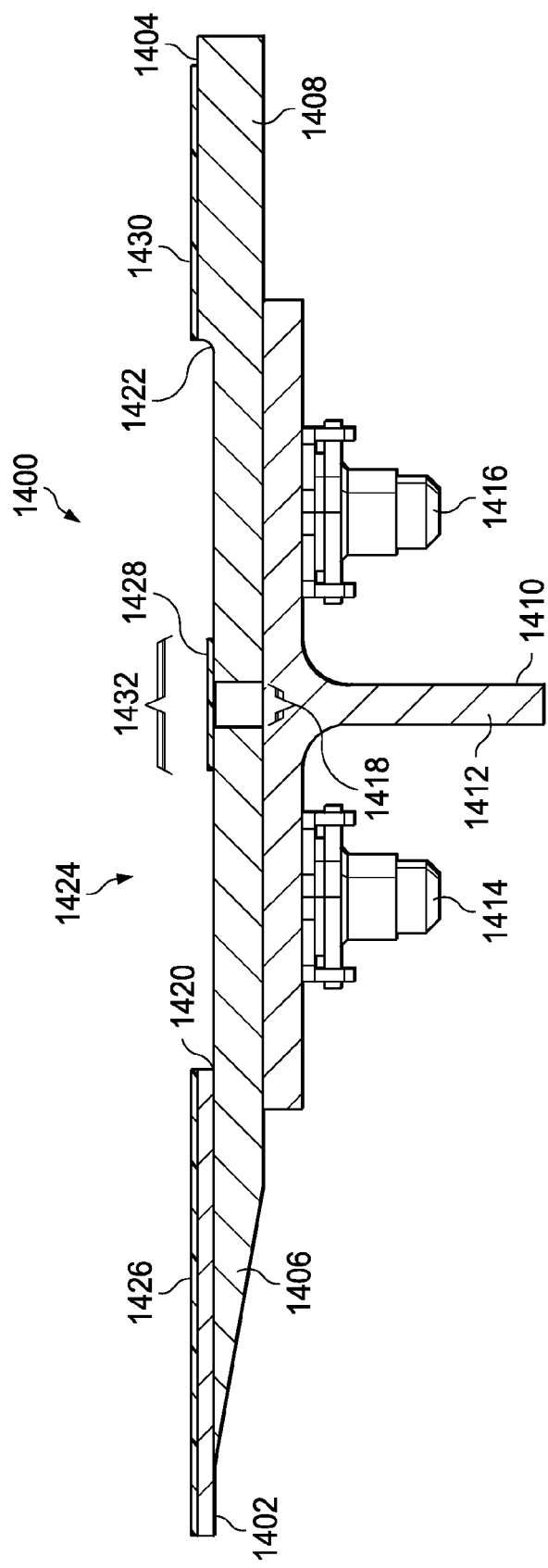
FIG. 14 is an illustration of a joint in which a strip may be installed in accordance with an advantageous embodiment.

With reference to FIG. 14, an illustration of a joint in which a strip may be installed is depicted in accordance with an advantageous embodiment. In this illustrative example, joint 1400 may comprise first skin panel 1402 and second skin panel 1404. First flange 1406 is associated with first skin panel 1402, and second flange 1408 is associated with second skin panel 1404.

In this illustrative example, first flange 1406 and second flange 1408 may be attached to support structure 1410, which may take the form of spar 1412. First flange 1406 may be secured to spar 1412 using fastener 1414. Second flange 1408 may be secured to spar 1412 using fastener 1416.

Gap 1418 may be present between first flange 1406 and second flange 1408 in these examples. Further, step 1420 and step 1422 may be present. This configuration of first skin panel 1402 and second skin panel 1404 may form channel 1424.

Masking material 1426, 1428, and 1430 may be placed over first skin panel 1402, gap 1418, and second skin panel 1404. First skin panel 1402 and second skin panel 1404 may be covered by masking material 1426 and 1430 to prevent contamination of panel surfaces during processing. Masking material 1428 may prevent adhesive from entering gap 1418. Width 1432 for masking material 1428 may be selected having a width capable of preventing adhesive from entering gap 1418.

Figure 15:
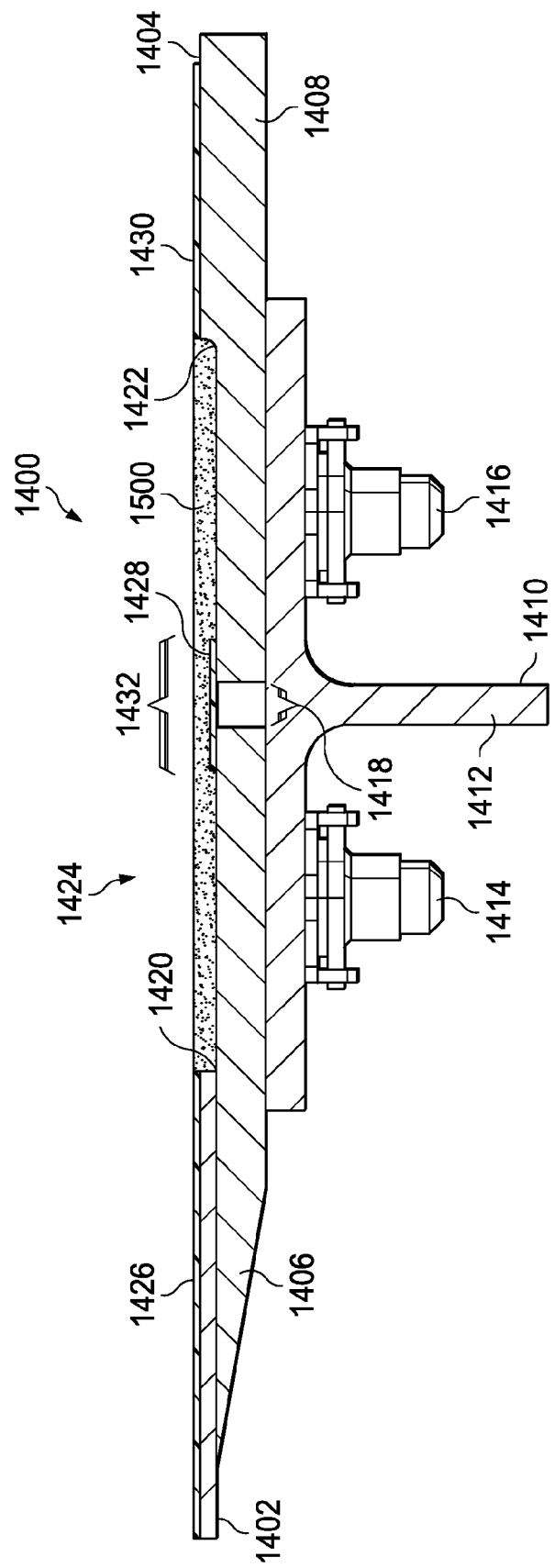
FIG. 15 is an illustration of a channel filled with sealant in accordance with an advantageous embodiment.

With reference now to FIG. 15, an illustration of a channel filled with adhesive is depicted in accordance with an advantageous embodiment. In this illustrative example, adhesive 1500 may be placed into channel 1424.

Adhesive 1500 may be placed into channel 1424 through a number of different mechanisms. For example, without limitation, a pneumatic seal gun with a wide nozzle may be used to apply adhesive. Further, a plastic sweep or other mechanism may be used to level adhesive within channel 1424.

Figure 16:
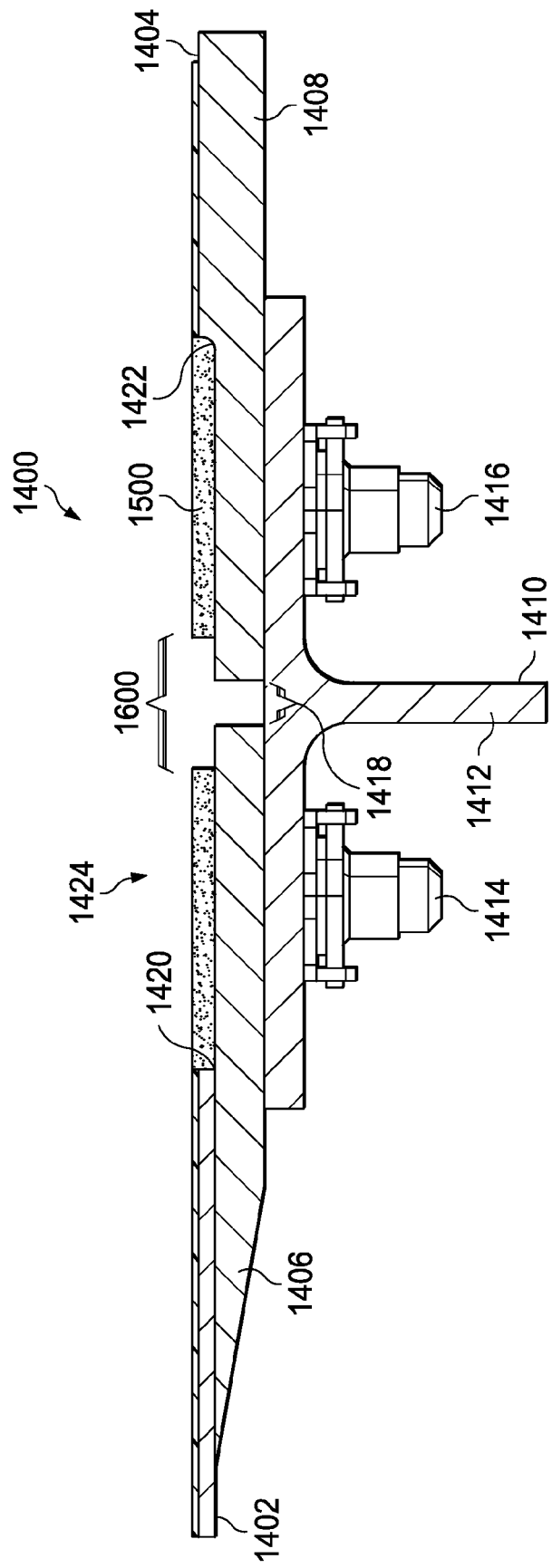
FIG. 16 is an illustration of sealant removed from portions of a joint in accordance with an advantageous embodiment.

With reference next to FIG. 16, an illustration of adhesive removed from portions of a joint is depicted in accordance with an advantageous embodiment. In this illustrative example, masking material 1426, 1428, and 1430 may be removed. In removing masking material 1428, adhesive 1500 may be removed from section 1600 in channel 1418. In this illustrative example, adhesive 1500 may be removed from section 1600 prior to removing masking material 1426 and masking material 1430 from first skin panel 1402 and second skin panel 1404.

Figure 17:
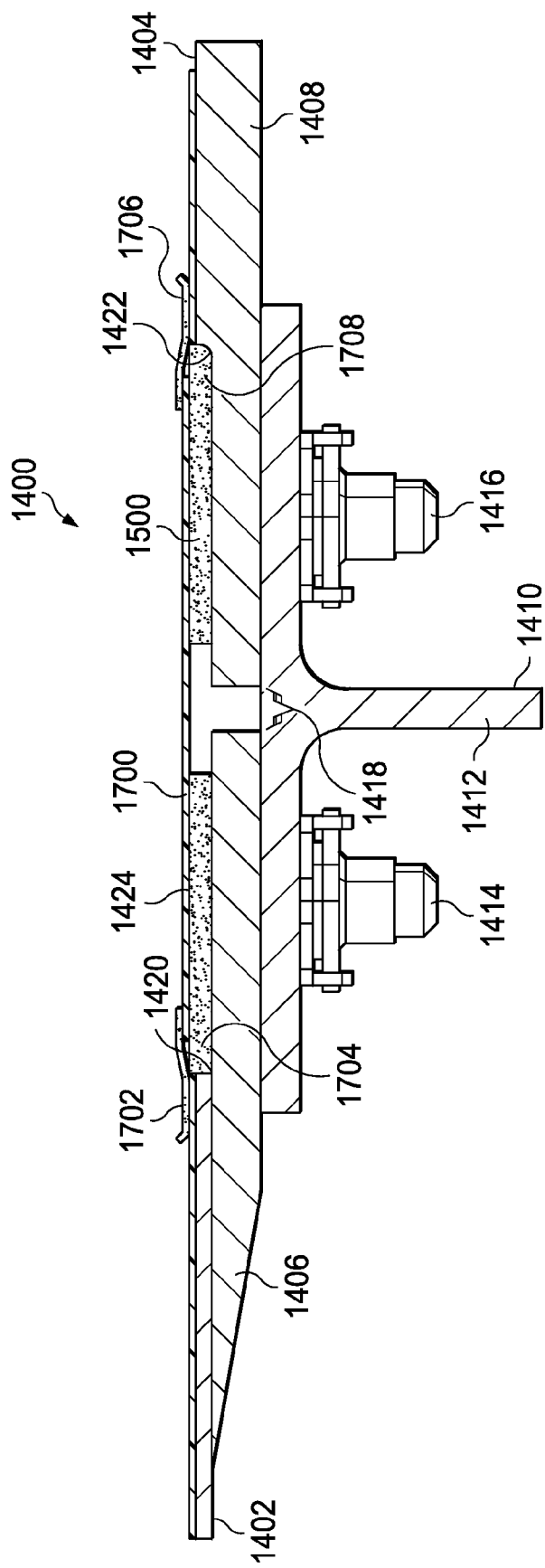
FIG. 17 is an illustration of a strip placed into a channel of a joint in accordance with an advantageous embodiment.

Turning to FIG. 17, an illustration of a strip placed into a channel of a joint is depicted in accordance with an advantageous embodiment. As illustrated in this depicted example, strip 1700 may be placed onto adhesive 1500. Further, tape 1702 may be used to seal side 1704 of strip 1700 to first skin panel 1402. Tape 1706 may be used to seal side 1708 of strip 1700 to second skin panel 1404.

In these illustrative examples, tape 1702 and tape 1706 may take the form of rivet tape. Rivet tape may have two strips of adhesive on the edges of the tape with a center area that has no adhesive.

In these examples, tape 1702 and tape 1706 may be placed onto side 1704 and side 1708 prior to strip 1700 being placed onto adhesive 1500. Thereafter, tape 1702 may be secured to first skin panel 1402, and tape 1706 may be secured to second skin pane 1404.

Figure 18:
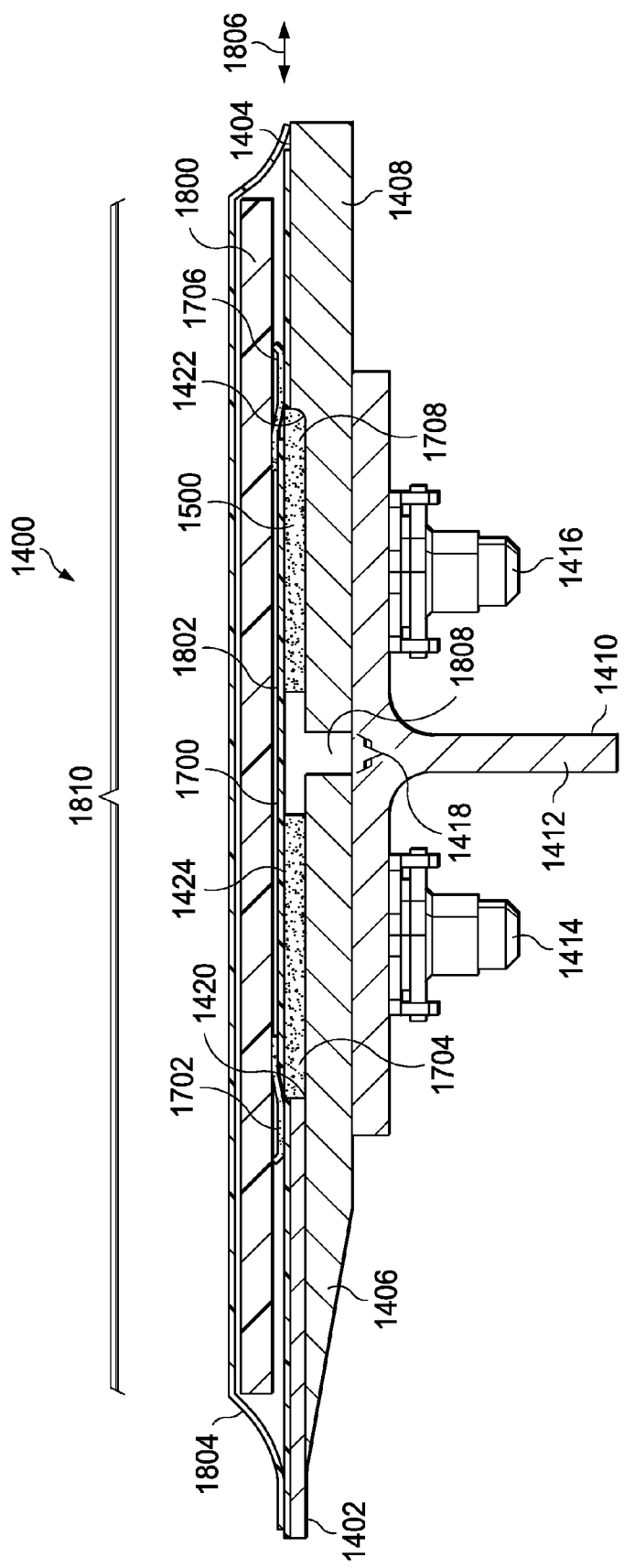
FIG. 18 is an illustration of a caul plate in a vacuum bag placed over a joint in accordance with an advantageous embodiment.

Turning now to FIG. 18, an illustration of a caul plate in a vacuum bag placed over a joint is depicted in accordance with an advantageous embodiment. In this illustrative example, caul plate 1800 may be placed on top side 1802 of strip 1700. Caul plate 1800 also may be taped into place. Further, vacuum bag 1804 may be placed over caul plate 1800 and strip 1700.

In these illustrative examples, caul plate 1800 may be stiffer along the direction of arrow 1806 as opposed to along a direction perpendicular to joint 1400 at point 1808. In these illustrative examples, caul plate 1800 may be comprised of an anisotropic material and/or an isotropic material. Examples of anisotropic materials that may be used include, for example, without limitation, a carbon fiber epoxy, wood, and/or other fiber reinforced composite materials. Examples of isotropic materials that may be used include, for example, without limitation, aluminum, steel, metal alloys, and other suitable materials.

Additionally, caul plate 1800 may have width 1810. Width 1810 may span across a portion of first skin panel 1402, strip 1700, and a portion of second skin panel 1404.

Figure 19:
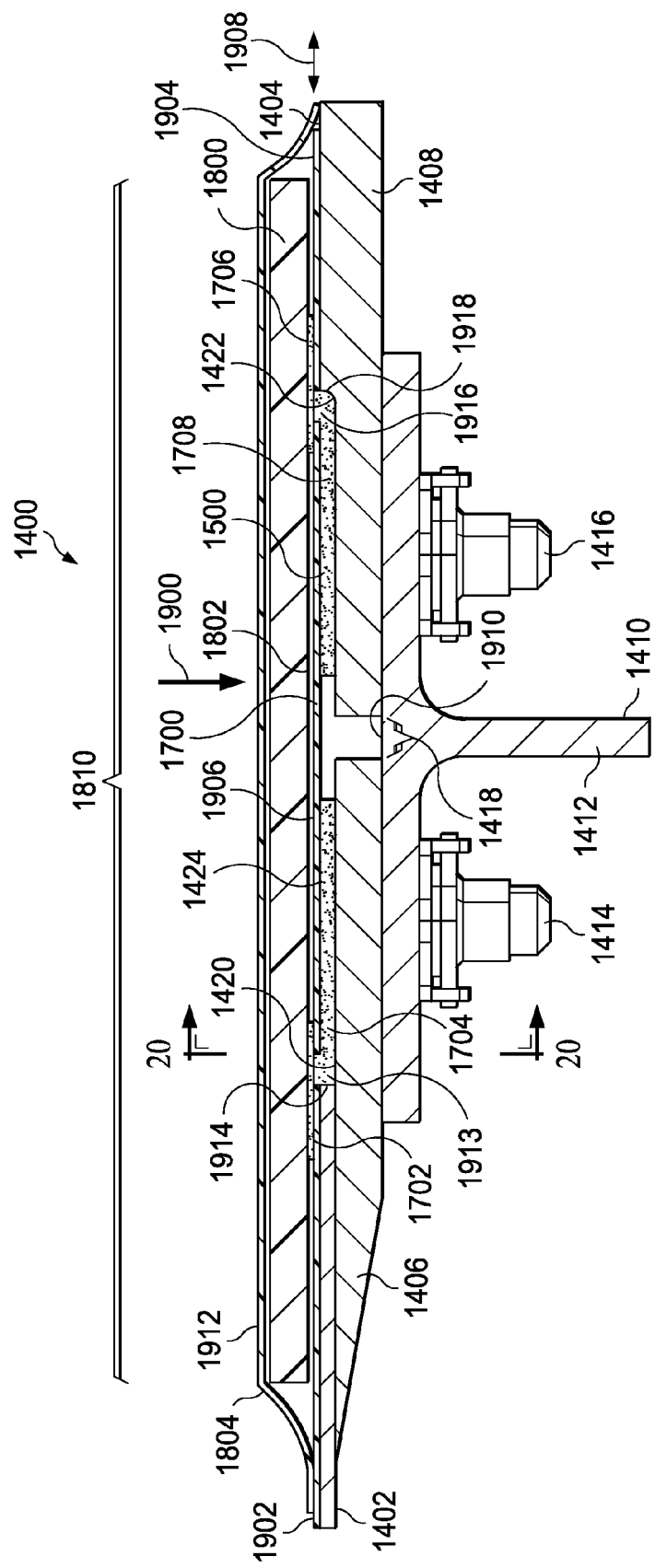
FIG. 19 is an illustration of a vacuum applied to a vacuum bag and caul plate in accordance with an advantageous embodiment.

With reference now to FIG. 19, an illustration of a vacuum applied to a vacuum bag and caul plate is depicted in accordance with an advantageous embodiment. In this illustrative example, a vacuum may be drawn on vacuum bag 1804. This vacuum may be around 25 in-hg to around 27 in-hg in these illustrative examples. The actual vacuum drawn may be selected as one that causes caul plate 1800 to move in the direction of arrow 1900 to force strip 1700 into channel 1424.

In this manner, caul plate 1800 may push strip 1700 in a manner that first surface 1902 of first skin panel 1402, second surface 1904 of second skin panel 1404, and third surface 1906 of strip 1700 are substantially aligned along a plane, including line 1908.

With this movement in the direction of arrow 1900, adhesive 1500 may move into gap 1418. In this illustrative example, end 1910 may be open to the atmosphere to allow movement of adhesive 1500 into gap 1418. In yet other advantageous embodiments, another end (not shown) opposite end 1406 also may be open to the atmosphere to allow movement of adhesive 1500 into gap 1418.

This vacuum may be held until adhesive 1500 has set-up and/or cured. In some advantageous embodiments, resistive heating element 1911 may be incorporated into vacuum bag 1804 to accelerate curing of adhesive 1500.

In this example, gap 1913 may be present between strip 1700 and end 1914 of first skin panel 1402. Gap 1916 may be present between strip 1700 and end 1918 of second skin panel 1404.

Figure 20:
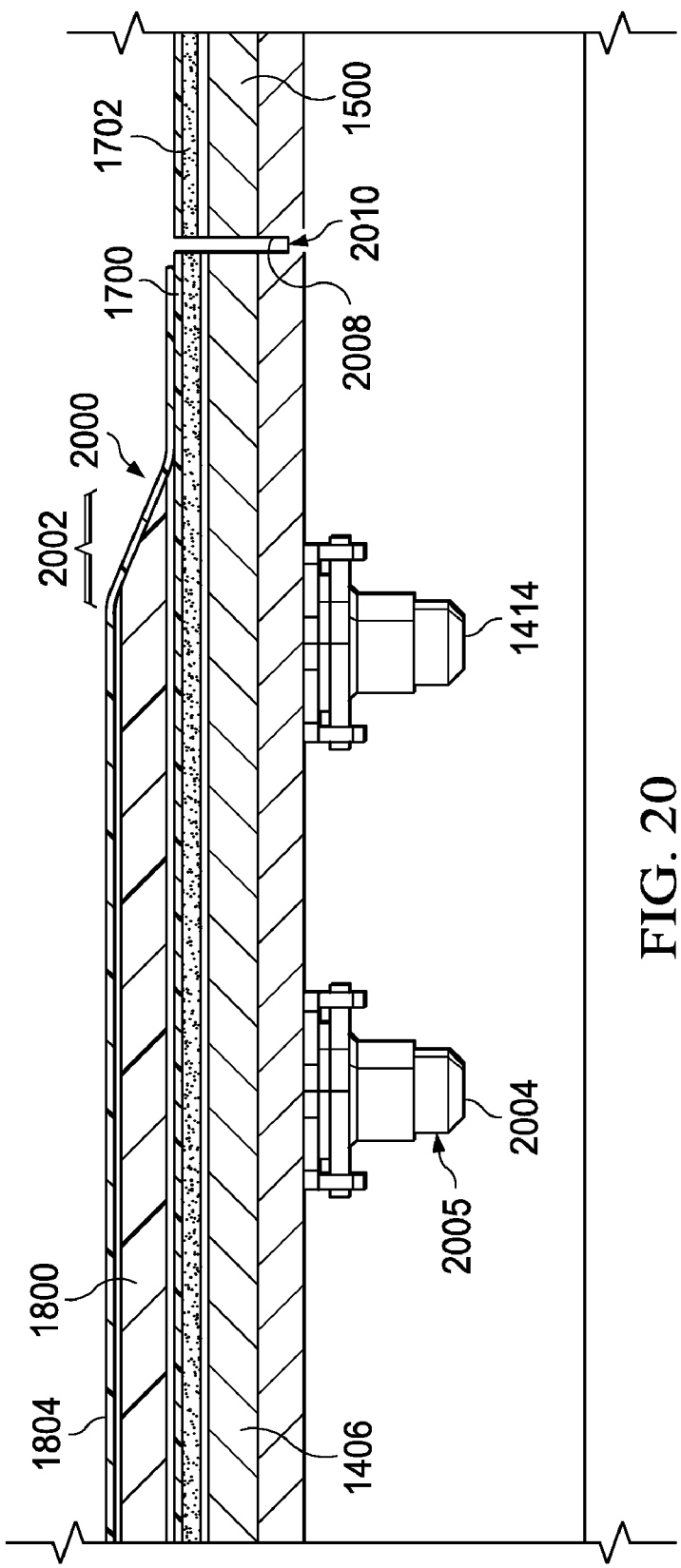
FIG. 20 is an illustration of a vacuum applied to a vacuum bag and a caul plate in accordance with an advantageous embodiment.

Turning now to FIG. 20, an illustration of a vacuum applied to a vacuum bag and a caul plate is depicted in accordance with an advantageous embodiment. In this illustrative example, a view of vacuum bag 1804, caul plate 1800, and strip 1700 on first skin panel 1402 is illustrated taken along lines 20-20 as depicted in FIG. 19. As can be seen in this example, caul plate 1800 has tapered end 2000. As depicted in this example, tapered end 2000 may be shorter in length than strip 1700. In this example, length 2002 of tapered end 2000 may be around ⅜ of an inch.

In this illustrative example, fastener 2004 and fastener 1414 may be fasteners within number of fasteners 2005. First flange 1406 associated with first skin panel 1402, not visible in this view, may be adjacent to flange 2006 in this example. Flange 2006 may be a flange associated with another skin panel not visible in this view.

As depicted in this example, adhesive 1500, strip 1700, tape 1702, and vacuum bag 1804 may stop at end 2008 of first flange 1406. End 2008 may be adjacent to gap 2010 in this example. Gap 2010 may be the gap between first flange 1406 and flange 2006. As can be seen in this illustrative example, gap 2010 may be a location at which a joint may be formed between first skin panel 1402 and the other skin panel not visible in this view. Gap 2010 may be filled with an adhesive either prior to or after application of strip 1700.

Figure 21:
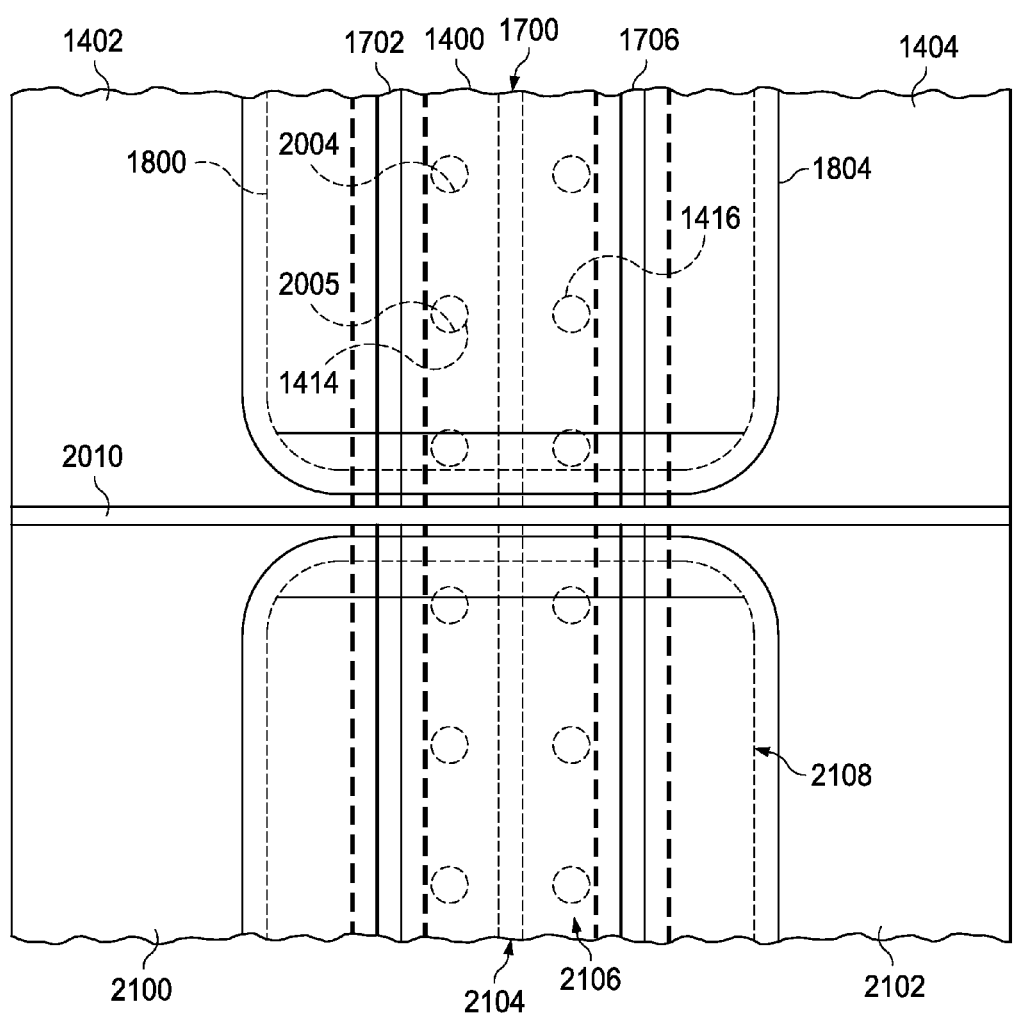
FIG. 21 is an illustration of a top view of a joint formed by using a strip, a caul plate, and a vacuum bag in accordance with an advantageous embodiment.

With reference now to FIG. 21, an illustration of a top view of a joint formed by using a strip, a caul plate, and a vacuum bag is depicted in accordance with an advantageous embodiment. As depicted in this illustrative example, joint 1400 may be formed using strip 1700, caul plate 1800, and vacuum bag 1804.

Flanges 1406, 1408, and 2006 may not be visible in this view. Fasteners within number of fasteners 2005, in addition to fastener 1414, 1416, and 2004, may be visible in this view. In this illustrative example, skin panel 1402 may be positioned adjacent to skin panel 2100 with gap 2010, and skin panel 1404 may be positioned adjacent to skin panel 2102 with gap 2010. Further, in a manner similar to joint 1400, joint 2104 may be formed using skin panel 2100, skin panel 2102, strip 2106, and caul plate 2108.

Figure 22:
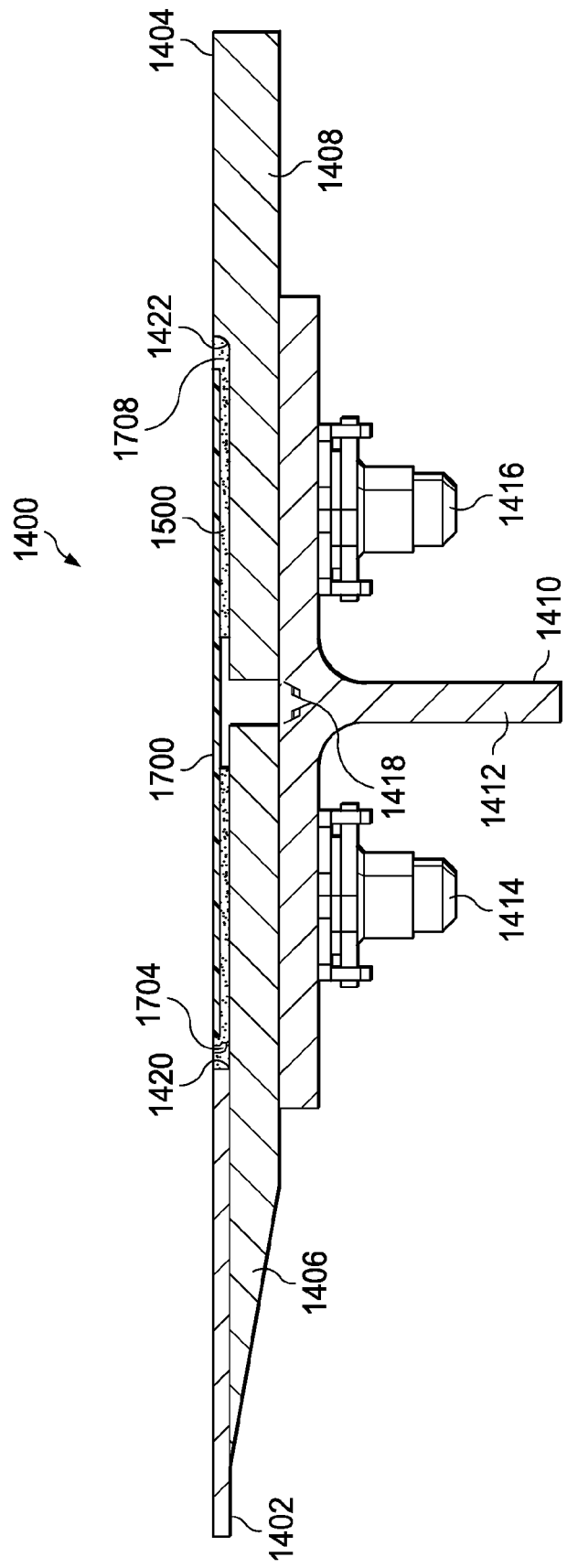
FIG. 22 is an illustration of a completed joint in accordance with an advantageous embodiment.

Turning now to FIG. 22, an illustration of a completed joint is depicted in accordance with an advantageous embodiment.

Figure 23:
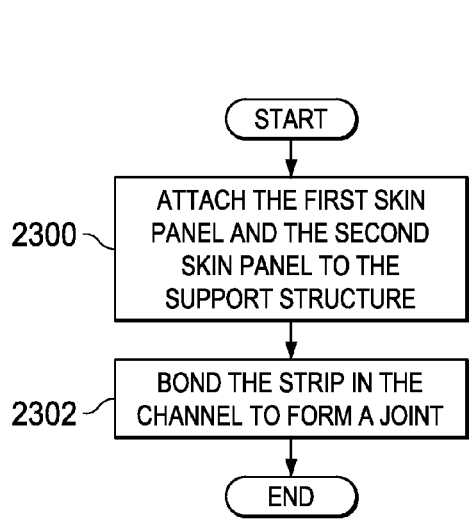
FIG. 23 is an illustration of a flowchart for forming a joint in accordance with an advantageous embodiment.

With reference now to FIG. 23, an illustration of a flowchart for forming a joint is depicted in accordance with an advantageous embodiment. The process in FIG. 23 may be used to form a joint such as, for example, without limitation, joint 334 in FIG. 3, joint 1200 in FIG. 12, and joint 1400 in FIG. 14.

The process may begin by attaching first skin panel 1202 and second skin panel 1204 to support structure 1210 (operation 2300). In these examples, these skin panels may be attached by attaching first flange 1206 for first skin panel 1202 and second flange 1208 for second skin panel 1204 to support structure 1210 using plurality of fasteners 342. The process may then bond strip 1004 in channel 1218 to form joint 1200 (operation 2302), with the process terminating thereafter. In this manner, joint 1200 may have desired state 345 of boundary layer 347 of fluid flow 306. In these examples, fluid flow 306 may take the form of airflow 308, and desired state 345 of airflow 308 in boundary layer 347 may be laminar airflow 310.

Figure 24:
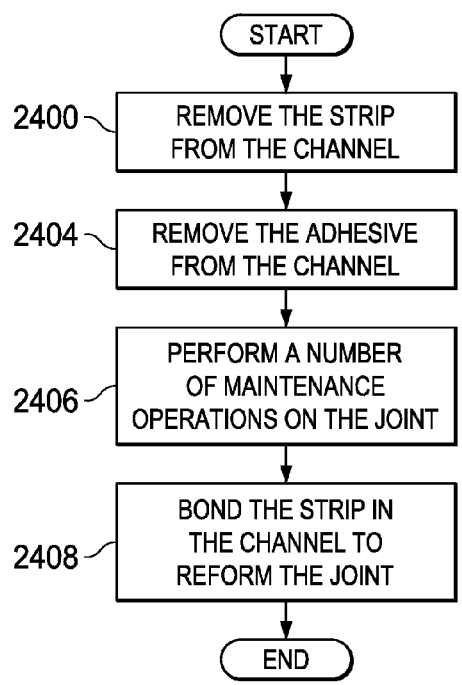
FIG. 24 is an illustration of a flowchart for performing maintenance on a joint in accordance with an advantageous embodiment.

Turning next to FIG. 24, an illustration of a flowchart for performing maintenance on a joint is depicted in accordance with an advantageous embodiment. The process in FIG. 24 may be used to perform maintenance on a joint such as, for example, without limitation, joint 334 in FIG. 3, joint 1200 in FIG. 12, and joint 1400 in FIG. 14.

The process may begin by removing strip 1004 from channel 1218 (operation 2400). Thereafter, adhesive 1222 also may be removed from channel 1218 (operation 2404). Thereafter, a number of maintenance operations may be performed on joint 1200 (operation 2406). These operations may include, for example, without limitation, replacing at least one of first skin panel 1202 and second skin panel 1204, painting at least one of first skin panel 1202 and second skin panel 1204, replacing plurality of fasteners 342, and/or other suitable maintenance operations. Thereafter, the process may then bond strip 1004 in channel 1218 to reform joint 1200 (operation 2408), with the process terminating thereafter.

Figure 25:
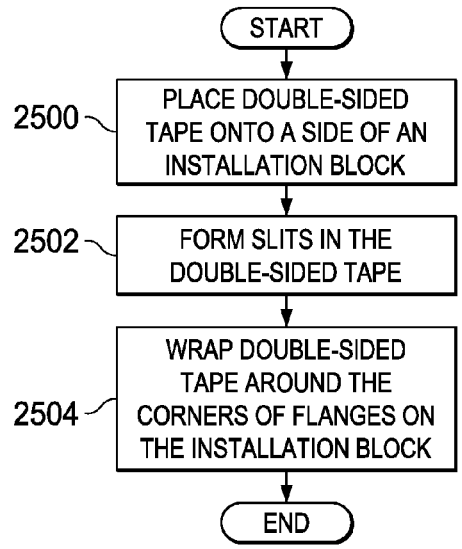
FIG. 25 is an illustration of a process for preparing a strip for bonding in a channel in accordance with an advantageous embodiment.

Turning now to FIG. 25, an illustration of a process for preparing a strip for bonding in a channel is depicted in accordance with an advantageous embodiment. The process illustrated in FIG. 25 may be implemented using installation block 800 in FIG. 8 and assembly crib 1008 in FIG. 10.

The process may begin by placing double-sided tape 802 onto side 804 of installation block 800 (operation 2500). Next, the process may form slit 810 and slit 812 in double-sided tape 802 (operation 2502). Then, double-sided tape 802 may be wrapped around the corners of flanges 816, 818, and 820 on installation block 800 (operation 2504), with the process terminating thereafter. In these examples, section 900 of double-sided tape 802 may be wrapped around corners 906 and 908 for flange 816. Section 902 of double-sided tape 802 may be wrapped around corners 910 and 912 for flange 818. Section 904 of double-sided tape 802 may be wrapped around corners 914 and 916 for flange 820 in installation block 800.

Figure 26:
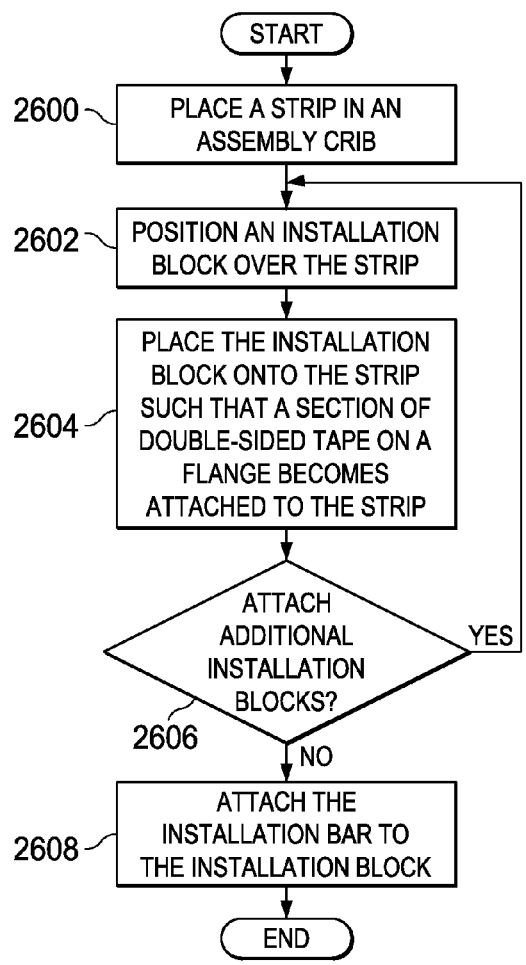
FIG. 26 is an illustration of a flowchart for attaching a strip to an installation block in accordance with an advantageous embodiment.

With reference now to FIG. 26, an illustration of a flowchart for attaching a strip to an installation block is depicted in accordance with an advantageous embodiment. The process illustrated in FIG. 26 may be implemented as part of a process for bonding strip 1004 in channel 1218 as depicted in FIG. 12, which may be one implementation of operation 2302 in FIG. 23 for bonding strip 344 in channel 336.

The process may begin by placing strip 1004 in assembly crib 1008 (operation 2600). Thereafter, installation block 800 may be positioned over strip 1004 (operation 2602). Installation block 800 may then be placed onto strip 1004 such that section 902 of double-sided tape 802 on flange 818 may become attached to strip 1004 (operation 2604). A determination may be made as to whether additional installation blocks are to be attached to strip 1004 (operation 2606).

If additional installation blocks are to be attached, the process returns to operation 2602. A number of installation blocks may be attached to strip 1004 in this manner. If additional installation blocks are not to be attached to strip 1004, installation bar 1000 may be attached to installation block 800 (operation 2606), with the process terminating thereafter. In other words, installation bar 1000 may be attached to installation blocks 800, 1112, and 1114 in these illustrative examples. Thereafter, strip 1004, the number of installation blocks, and installation bar 1000 may be ready for use to install strip 1004 in channel 1218.

Figure 27:
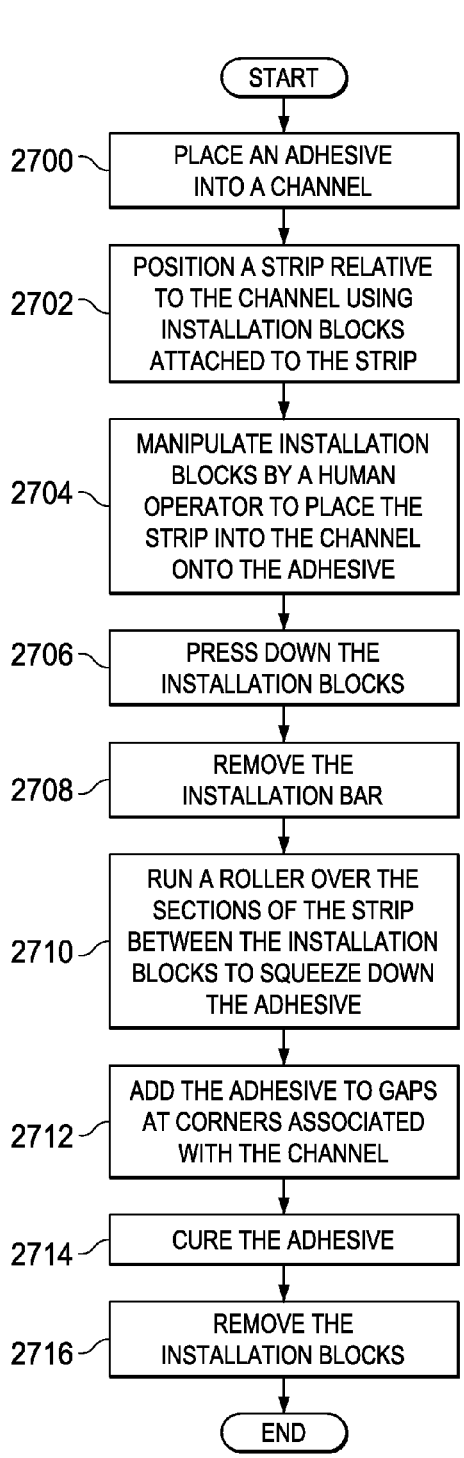
FIG. 27 is an illustration of a flowchart of a process for positioning a strip in a channel for bonding in accordance with an advantageous embodiment.

With reference now to FIG. 27, an illustration of a flowchart of a process for positioning a strip in a channel for bonding is depicted in accordance with an advantageous embodiment. This process may be used in bonding strip 1004 in channel 1218 as depicted in FIG. 12. This process may be one implementation of the process in operation 2302 in FIG. 23 above.

The process may begin by placing adhesive 1222 into channel 1218 (operation 2700). The process may then position strip 1004 relative to channel 1218 using installation blocks 800, 1112, and 1114, which are attached to strip 1004 (operation 2702).

The assembly of installation block 800, installation block 1112, and installation block 1114, as attached to strip 1004 and installation bar 1000, may then be manipulated by a human operator to place strip 1004 into channel 1218 onto adhesive 1222 (operation 2704). This positioning of the installation blocks may provide a desired positioning of strip 1004. The positioning of the installation blocks also may be performed using guard rails 1010 and 1012. In other words, the installation blocks enable precise matching of surface 1232 of first skin panel 1202, surface 1234 of second skin panel 1204, and surface 1248 of strip 1004 in a desired configuration.

The process may then press down on the installation blocks (operation 2706). By pressing down on installation blocks 800, 1112, and 1114, flanges 816 and 820 may be firmly attached to surface 1232 of first skin panel 1202 and surface 1234 of second skin panel 1204. Thereafter, installation bar 1000 may be removed (operation 2708). Roller 1314 may then be run over the sections of strip 1004 between installation blocks 800, 1112, and 1114 to squeeze down adhesive 1222 (operation 2710). In these illustrative examples, these sections may be, for example, without limitation, sections 1304, 1306, 1308, and 1310.

The process may then add adhesive 1222 to gaps 1240 and 1242 at corners 1244 and 1246 associated with channel 1218, respectively (operation 2712). In one advantageous embodiment, adhesive 1222 may be added using a syringe. In other advantageous embodiments, a different type of sealant may be used in the place of adhesive 1222.

The process may then cure the adhesive (operation 2714). Adhesive 1222 may function as a shim once adhesive 1222 has been cured. In this manner, strip 1004 may be maintained in the desired position. The corners of the channel are filled with adhesive/sealant injected by means of a syringe. Thereafter, installation blocks 800, 1112, and 1114 may be removed (operation 2716), with the process terminating thereafter.

Maintenance on joint 1200 may be performed by removing strip 1004 from joint 1200. Other operations also may be performed. Afterwards, strip 1004 or a new strip may be bonded into channel 1218 in the manner described in FIG. 27.

Figure 28:
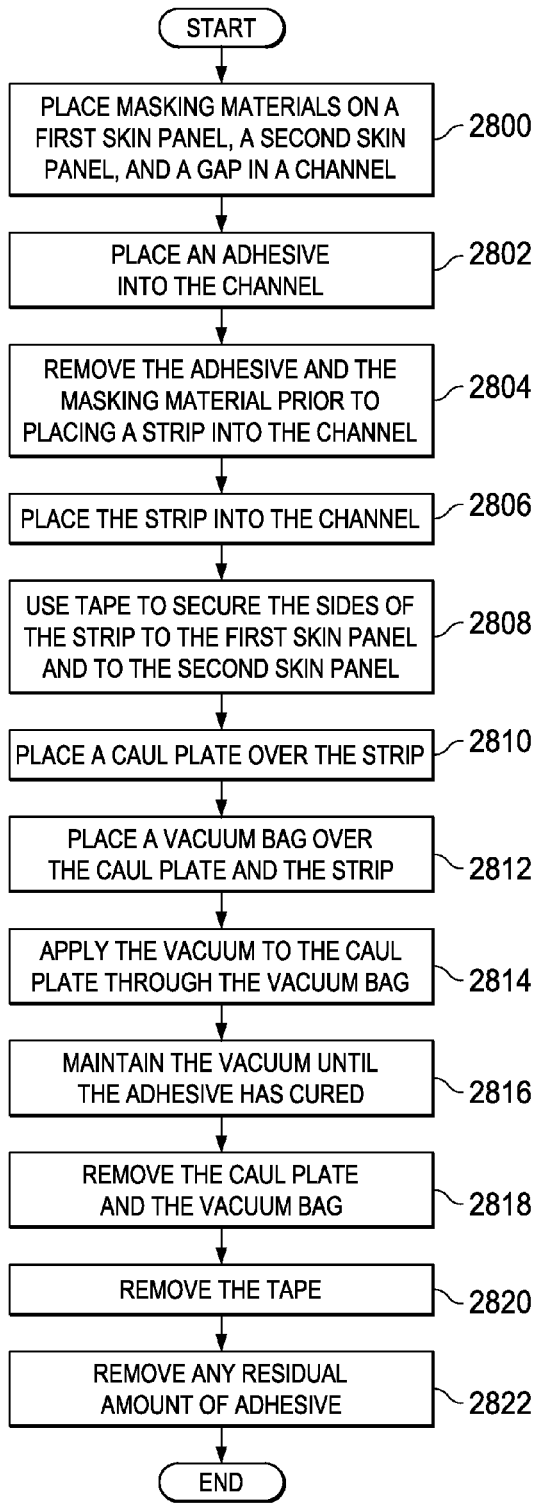
FIG. 28 is an illustration of a flowchart of a process for bonding a strip in a channel in accordance with an advantageous embodiment.

Turning now to FIG. 28, an illustration of a flowchart of a process for bonding a strip in a channel is depicted in accordance with an advantageous embodiment. This process may be used to bond strip 1700 into channel 1424 to form joint 1400. This process may be a more-detailed illustration of operation 2302 in FIG. 23 above.

The process may begin by placing masking material 1426, 1428, and 1430 on first skin panel 1402, second skin panel 1404, and gap 1418 in channel 1424 (operation 2800). Thereafter, adhesive 1500 may be placed into channel 1424 (operation 2802). Adhesive 1500 and masking material 1428 may be removed prior to placing strip 1700 into channel 1424 (operation 2804). Adhesive 1500 and masking material 1428 may be removed to expose gap 1418 within channel 1424.

Next, strip 1700 may be placed into channel 1424 (operation 2806). Tape 1702 may be used to secure side 1704 of strip 1700 to first skin panel 1402, and tape 1706 may be used to secure side 1708 of strip 1700 to second skin panel 1404 (operation 2808). Caul plate 1800 may then be placed over strip 1700 (operation 2810). Additionally, vacuum bag 1804 may be placed over caul plate 1800 and strip 1700 (operation 2812). Operation 2812 may involve securing vacuum bag 1804 around caul plate 1800.

The process may then apply a vacuum to caul plate 1800 through vacuum bag 1804 (operation 2814). With this vacuum, caul plate 1800 may push strip 1700 into channel 1424 in a manner such that first surface 1902 of first skin panel 1402, second surface 1904 of second skin panel 1404, and third surface 1906 of strip 1700 may be substantially aligned along a plane. This alignment may allow for desired state 345 for fluid flow 306. The process may then maintain the vacuum until adhesive 1500 has cured (operation 2816). Thereafter, caul plate 1800 and vacuum bag 1804 may be removed (operation 2818). Tape 1702 and tape 1706 also may then be removed (operation 2820). Any residual amount of adhesive 1500 may then be removed (operation 2822), with the process terminating thereafter.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, operation 2300 in FIG. 23 may be replaced with an operation in which the strip is removed or maintenance is performed on the joint prior to performing operation 2302.

Thus, the different advantageous embodiments may provide a method and apparatus for a joint for a surface of a platform. In these examples, an apparatus may have a first skin panel having a first surface, a second skin panel having a second surface, a first flange located at the end of the first skin panel, a second flange located at the end of the second skin panel, and a strip having a third surface.

The first skin panel may be located adjacent to the second skin panel such that the first flange and the second flange form a channel. The strip may be bonded in the channel. This location of the strip and channel may be such that fluid flow over the third surface of the strip, the first surface of the first skin panel, and the second surface of the second skin panel may have a desired boundary layer state.

The different advantageous embodiments may provide a capability to generate airflow at a substantially desired state at the boundary layer. For example, the desired state at the boundary layer may be a substantially laminar airflow over the surface of an aircraft.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to aircraft, the different advantageous embodiments may be applied to other types of platforms. For example, without limitation, other advantageous embodiments may be applied to a mobile platform, a stationary platform, a land-based structure, an aquatic-based structure, a space-based structure, and/or some other suitable object in which fluid flow may be present. More specifically, the different advantageous embodiments may be applied to, for example, without limitation, a submarine, a bus, a personnel carrier, a tank, a train, an automobile, a spacecraft, a surface ship, and/or some other suitable object.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for directing fluid flow over a set of surfaces, comprising:
   a first skin panel having a first surface;
   a second skin panel having a second surface;
   a first flange located at an end of the first skin panel;
   a second flange located at an end of the second skin panel, in which the first skin panel is located adjacent to the second skin panel such that the first flange and the second flange form a channel; and
   a strip having a third surface, in which the strip is bonded in the channel to the first flange and to the second flange, in which fluid flow over the third surface of the strip, the first surface of the first skin panel, and the second surface of the second skin panel has a desired state, the strip substantially occupying the channel such that fluid flow passes substantially over the first surface of the first skin, the second surface of the second skin, and the third surface of the strip and is restricted from flowing under the first skin, the second skin, and the strip.

2. The apparatus of claim 1, wherein the desired state of the fluid flow at a boundary layer is a substantially laminar airflow.

3. The apparatus of claim 1 further comprising:
   a plurality of fasteners, wherein the plurality of fasteners attach the first flange and the second flange to a support structure.

4. The apparatus of claim 3, wherein the support structure is selected from one of a spar, a frame, a stringer, a clip, and a rib.

5. The apparatus of claim 1, wherein a first gap is present between a first side of the strip and the end of the first skin panel and a second gap is present between a second side of the strip and the end of the second skin panel.

6. The apparatus of claim 1 further comprising:
   a coating attached to at least a portion of the first surface of the first skin panel, wherein the coating extends into the channel.

7. The apparatus of claim 1 further comprising:
   an aircraft, wherein the first skin panel and the second skin panel are located on the aircraft.

8. The apparatus of claim 1, wherein the first skin panel and the second skin panel are comprised of a material selected from one of aluminum, steel, titanium, and a composite material.

9. The apparatus of claim 1, wherein the strip is comprised of a material selected from one of aluminum, steel, titanium, and a composite material.

10. The apparatus of claim 1 further comprising:
an adhesive, wherein the adhesive bonds in the channel and the adhesive is configured to act as a sealant.

11. The apparatus of claim 3, wherein the plurality of fasteners have a plurality of heads and wherein the plurality of heads is substantially coplanar to a surface of the first flange and a surface of the second flange through which the plurality of fasteners extend.

12. The apparatus of claim 11, wherein the plurality of heads has a non-stick coating.

13. The apparatus of claim 1, wherein the first skin panel, the second skin panel, the first flange, the second flange, and the strip form a joint, and wherein the joint is located on a platform.

14. The apparatus of claim 13, wherein the platform is selected from one of a mobile platform, a stationary platform, an aircraft, a submarine, a bus, a personnel carrier, a tank, a train, an automobile, a spacecraft, and a surface ship.

15. An aircraft joint comprising:
a first skin panel having a first surface, in which the first skin panel is located on an aircraft;
a second skin panel having a second surface, in which the second skin panel is located on the aircraft, and in which the first skin panel and the second skin panel are comprised of a material selected from one of aluminum, steel, titanium, and a composite material;
a first flange located at an end of the first skin panel;
a second flange located at an end of the second skin panel, in which the first skin panel is located adjacent to the second skin panel such that the first flange and the second flange form a channel;
a plurality of fasteners, in which the plurality of fasteners attach the first flange and the second flange to a spar, in which the plurality of fasteners has a plurality of heads having a non-stick coating, and in which the plurality of heads is substantially coplanar to a surface of the first flange and a surface of the second flange through which the plurality of fasteners extend;
a strip having a third surface, in which the strip is bonded in the channel, in which a first gap is present between a first side of the strip and the end of the first skin panel and a second gap is present between a second side of the strip and the end of the second skin panel, and in which the strip is comprised of a material selected from one of aluminum, steel, titanium, and the composite material;
an adhesive, in which the adhesive bonds the strip in the channel, and in which the adhesive is configured to act as a sealant; and
a coating attached to at least a portion of the first surface of the first skin panel, in which the coating extends into the channel, such that airflow is directed over the third surface of the strip, the first surface of the first skin panel, and the second surface of the second skin panel and such that the airflow has a substantially laminar airflow.

16. An apparatus for directing airflow over a wing, comprising:
a first skin panel having an upper surface, the first skin panel proximate a leading edge of the aircraft, the first skin panel comprising one of aluminum, steel, and titanium;
a second skin panel having an upper surface, the second skin panel comprising a composite material;
a first flange located at an end of the first skin panel, the first skin panel attached to the first flange;
a second flange located at an end of the second skin panel, the second skin panel formed with the second flange, in which the first skin panel is located adjacent to the second skin panel such that the first flange and the second flange form a channel; and
a single material strip having an upper surface, in which the strip is bonded in the channel to the first flange and to the second flange so as to substantially occupy the channel such that air flows over the upper surface of the first skin, the upper surface of the second skin, and the upper surface of the strip, and such that air flows in a desired state.

17. The apparatus of claim 16, wherein the strip substantially contacts the first flange and the second flange so as to prevent air flow between the strip and the first flange and the second flange.

18. The apparatus of claim 16, wherein the first skin panel and the second skin panel do not substantially move with respect to the strip.

19. The apparatus of claim 16, wherein the strip is bonded in the channel with adhesive so as to restrict airflow to the upper surface of the strip.

20. The apparatus of claim 16, wherein the upper surface of the first skin panel, the upper surface of the second skin panel, and the supper surface of the strip substantially align along a common plane.

21. The apparatus of claim 1, wherein the first skin panel is attached to the first flange and the second skin panel is formed with the second flange.

22. The apparatus of claim 21 wherein the first skin panel comprises a metal skin and the second skin panel comprises a composite skin.

23. The apparatus of claim 22, wherein the first skin panel comprises titanium.

24. The apparatus of claim 1, wherein the first skin panel and the first flange comprise separate structures.

* * * * *